United States Patent
Wong

(10) Patent No.: US 12,521,650 B2
(45) Date of Patent: Jan. 13, 2026

(54) FILTRATION DEVICE AND WATER FILTRATION PITCHER COMPRISING THE SAME

(71) Applicant: KING'S FLAIR INNOVATIVE MARKETING LIMITED, Tortola (VG)

(72) Inventor: Siu Wah Wong, Tortola (VG)

(73) Assignee: KING'S FLAIR INNOVATIVE MARKETING LIMITED, Tortola (VG)

( * ) Notice: Subject to any disclaimer, the term of this patent is extended or adjusted under 35 U.S.C. 154(b) by 255 days.

(21) Appl. No.: 18/512,131

(22) Filed: Nov. 17, 2023

(65) Prior Publication Data

US 2024/0157275 A1 May 16, 2024

Related U.S. Application Data

(63) Continuation-in-part of application No. 16/861,612, filed on Apr. 29, 2020, now Pat. No. 11,857,896.
(Continued)

(51) Int. Cl.
*B01D 24/04* (2006.01)
*B01D 39/04* (2006.01)
(Continued)

(52) U.S. Cl.
CPC ............ *B01D 24/04* (2013.01); *B01D 39/04* (2013.01); *B01D 39/06* (2013.01); *C02F 1/003* (2013.01); *B01D 2101/02* (2013.01); *B01D 2239/025* (2013.01); *C02F 2101/12* (2013.01); *C02F 2201/006* (2013.01); *C02F 2307/04* (2013.01)

(58) Field of Classification Search
CPC ......................... B01D 19/0063; B01D 37/045
See application file for complete search history.

(56) References Cited

U.S. PATENT DOCUMENTS 3,814,245 A * 6/1974 Hirs ................... B01D 24/4631
210/279
6,322,705 B1 * 11/2001 Stornes .............. B01D 24/4642
210/275
(Continued)

FOREIGN PATENT DOCUMENTS

WO 2007/010549 A1 1/2007

*Primary Examiner* — Youngsul Jeong
(74) *Attorney, Agent, or Firm* — HSML P.C.

(57) ABSTRACT

The present invention relates to a filtration device adapted for removably installing to a container, comprising a first housing portion, a second housing portion coupled to the first housing portion, and a filter element assembly constructed as a replaceable cartridge. The filter element assembly comprising an enclosure defining a compartment therein, a first filter media situated upstream the compartment, and a second filter media disposed within the compartment. The enclosure is formed from a fluid permeable material and is structurally supported by a support member situated within the compartment and upstream the second filter media, the support member is provided with a deflector, such that at least a portion of fluid that has passed through the first filter media is directed away from a circumferential side of the enclosure before entering the second filter media. The present invention also discloses a water filtration pitcher comprising the filtration device.

20 Claims, 20 Drawing Sheets

Related U.S. Application Data

(60) Provisional application No. 62/840,799, filed on Apr. 30, 2019.

(51) Int. Cl.
  *B01D 39/06* (2006.01)
  *C02F 1/00* (2023.01)
  *C02F 101/12* (2006.01)

(56) References Cited

U.S. PATENT DOCUMENTS

| | | | |
|---|---|---|---|
| 7,938,276 B2 * | 5/2011 | Goldman | B01D 29/27 210/502.1 |
| 2007/0187315 A1 * | 8/2007 | Vinogradova | C02F 1/003 210/85 |
| 2018/0099237 A1 * | 4/2018 | Silverwood | B01D 24/008 |

* cited by examiner

FILTRATION DEVICE AND WATER FILTRATION PITCHER COMPRISING THE SAME

FIELD OF THE INVENTION

The present invention relates to fluid filters and, more specifically, to a filtration device designed for removable installation on containers, which serves to efficiently remove impurities and contaminants from various fluids. The present invention is particularly suitable for effective filtration of liquids to maintain the integrity and quality of the contained substance, including but not limited to applications in household, food processing, and environmental sectors.

BACKGROUND OF THE INVENTION

Filtration devices have long been employed to separate undesirable particulate matter, microbes, or chemical compounds from fluids in a wide range of industrial and domestic applications. In many of these applications, it is crucial to achieve a high level of purity and consistency in the filtered product to meet quality standards and regulatory requirements.

Traditional filtration devices often consist of a housing with an inlet and an outlet, and a filter element situated in between. The filter element is typically composed of one or more media, such as fibrous materials, membranes, or other structures with varying pore sizes, designed to trap and remove particles and contaminants as the fluid flows through. However, there are challenges associated with the efficiency, maintenance, and ease of use of these conventional filtration systems.

In some cases, existing filtration systems are complex and not easily replaceable or maintainable, which can result in costly downtime and resource expenditures for users. Furthermore, the flow dynamics within these systems may not be optimized for maximal filtration efficiency, leading to potential clogging or incomplete filtration.

Therefore, there is a need for an improved filtration device that offers enhanced filtration efficiency, ease of maintenance, and adaptability to various applications, while addressing the limitations of existing filtration systems.

SUMMARY OF THE INVENTION

The present invention is conceived with the primary objective of providing a filtration device that overcomes the drawbacks of conventional systems by offering a novel and efficient design that optimizes the filtration process. This invention aims to enhance the ease of replacement and maintenance of the filter elements, thus reducing downtime and operational costs. Additionally, it aspires to achieve a higher level of filtration efficiency while preserving ease of maintenance. The invention also seeks to offer adaptability and versatility for use in diverse industries and applications.

According to an aspect of the present invention there is provided a filtration device adapted for removably installing to a container, comprising:
  a first housing portion, comprising a filter inlet, and defining a first internal space for temporarily accommodating fluid to be filtered;
  a second housing portion coupled to the first housing portion, comprising a filter outlet, and defining a second internal space positioned downstream the first internal space; and
  a filter element assembly is constructed as a replaceable cartridge situated within the second internal space, comprising:
    an enclosure defining a compartment therein;
    a first filter media situated upstream the compartment; and
    a second filter media disposed within the compartment;
  wherein the enclosure is formed from a fluid permeable material and is structurally supported by a support member situated within the compartment and upstream the second filter media, the support member is provided with a deflector, such that at least a portion of fluid that has passed through the first filter media is directed away from a circumferential side of the enclosure before entering the second filter media.

In an embodiment, the deflector comprises an annular lip at its downstream end, the annular lip is angled downward to direct the flow of fluid away from the circumferential side.

Preferably, the replaceable cartridge is constructed by ultrasonic welding the enclosure, the first filter media, and the deflector together.

In an embodiment, the first filter media comprises one or more filtering substrates comprising polymer-based nanofibers; and the second filter media is adapted for filtering contaminants such as chlorides in the fluid, and comprises a granular filtration material such as activated carbon, ion exchange resin or a combination thereof.

Preferably, the support member is made of rigid or stiff materials.

In an embodiment, the enclosure has a complementary shape with respect to the second internal space.

Preferably, the second housing portion is detachably coupled to the first housing portion by means of threaded engagement; the filter element assembly are secured by means of the coupling between the first housing portion and the second housing portion.

In an embodiment, the filter element assembly is provided with an annular flange adapted for interfacing with an annular ridge provided on the second housing portion, the annular ridge abuts against the annular flange and the first housing portion when the first housing portion is coupled with the second housing portion.

In an embodiment, the first housing portion comprises a bottom with a plurality of apertures, with the bottom abutting against the first filter media, an annular gasket is provided between the bottom and the first filter media for facilitating sealing therebetween.

In an embodiment, the filter device further comprising a lid assembly adapted for forming a closure for the filter inlet of the first housing portion, the lid assembly provides a re-closable inlet at a center thereof, and a pivotably mounted closure member is provided for closing the re-closable inlet, the re-closable inlet is tapered towards the center for facilitating the flow of fluid thereto, wherein a sieve is provided immediately downstream the re-closable inlet.

According to another aspect of the present invention, there is provided a water filtration pitcher comprising:
  a water pitcher body having a top opening;
  a filtration device removably installable within the water pitcher body, comprising:
    a first housing portion comprising a filter inlet and defining a first internal space for temporarily accommodating fluid to be filtered;
    a second housing portion coupled to the first housing portion, the second housing portion comprising a filter outlet and defining a second internal space positioned downstream the first internal space; and a filter element assembly situated within the second internal space, comprising:
an enclosure defining a compartment therein;
a first filter media situated upstream the compartment; and
a second filter media disposed within the compartment;
wherein the enclosure is formed from a fluid permeable material and is structurally supported by a support member situated within the compartment and upstream the second filter media, the support member is provided with a deflector, such that at least a portion of fluid that has passed through the first filter media is directed away from a circumferential side of the enclosure before entering the second filter media.

In an embodiment, the deflector comprises an annular lip at its downstream end, the annular lip is slightly angled downward to direct the flow of fluid away from the circumferential side.

Preferably, the filter element assembly is constructed as a replaceable cartridge by ultrasonic welding the enclosure, the first filter media, and the deflector together.

In an embodiment, the first filter media comprises one or more filtering substrates comprising polymer-based nanofibers.

Preferably, the second filter media is adapted for filtering contaminants such as chlorides in the fluid, and comprises a granular filtration material such as activated carbon, ion exchange resin or a combination thereof.

In an embodiment, where the filtration device comprises a lid assembly adapted for forming a closure for the filter inlet of the first housing portion.

In an embodiment, the lid assembly provides a re-closable inlet at a center thereof, and a pivotably mounted closure member is provided for closing the re-closable inlet.

Preferably, wherein a sieve is provided immediately downstream the re-closable inlet.

In an embodiment, wherein a pivotably mounted closure member is provided for closing the re-closable inlet.

In an embodiment, the filtration device is configured to form a closure for the top opening of the water filtration pitcher.

DETAILED DESCRIPTION OF THE INVENTION

Figure 1:
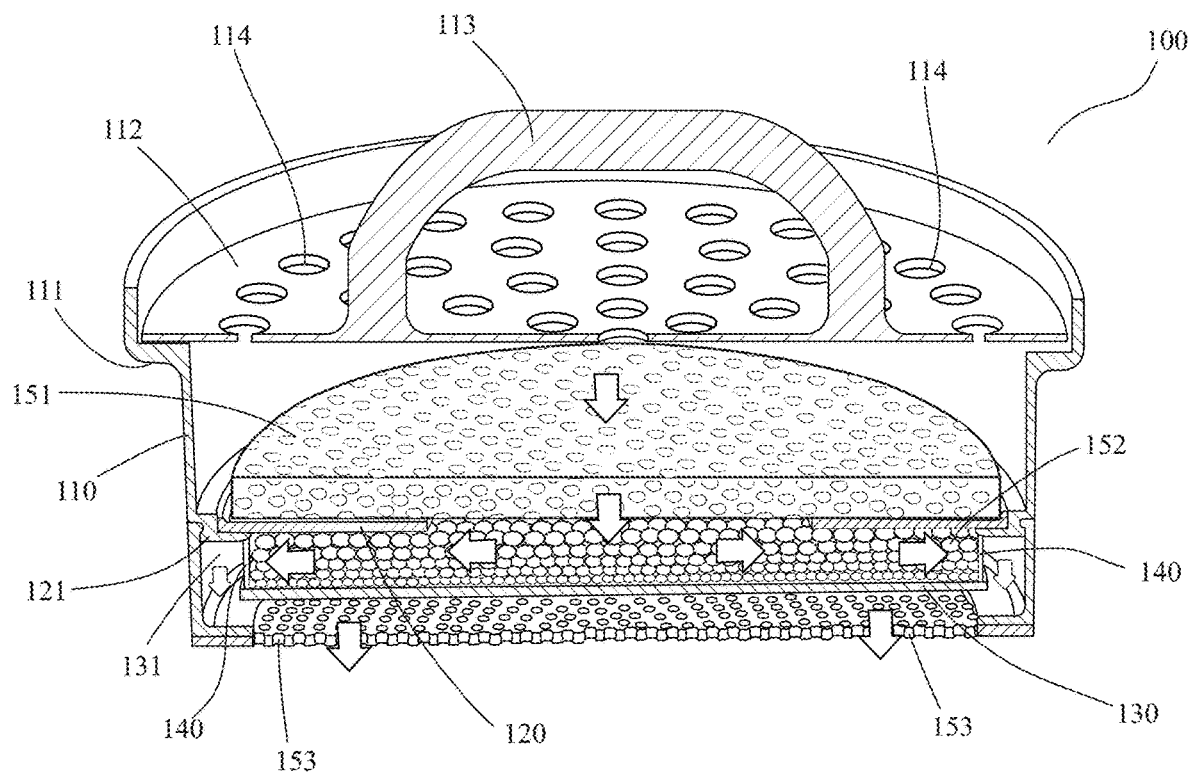
FIG. 1 is a cross-sectional view of a water filter constructed consistent with a first embodiment of the invention.

While this invention is illustrated and described in preferred embodiments, the fluid filters and the containers of the present invention may be produced in many different configurations, sizes, forms and materials.

Referring now to the drawings, FIGS. 1 to 4 illustrate a water filter constructed consistent with a first preferred embodiment of the present invention. The water filter 100 is in a compact disc shape and comprises a housing 110 having open top and open bottom, an upper rim 111 adjacent to the open top, a top cover 112 removably placed over the upper rim 111, a handle 113 extending upwardly from the top cover 112 and useful to grasp the top cover 112. The top cover 112 is formed with a plurality of apertures which serve as water inlets 114 of the water filter 100 to allow for flow of the water into the housing 110. The water inlets 114 are distributed over the whole top cover 112, which may increase the flow rate of the water into the filter 100.

The housing 110 houses a deflector plate 120 snugly carried on a support member 121 that laterally and circumferentially extends from a side wall of the housing 110, and a water impermeable plate 130 disposed in a vertical direction relative to the deflector plate 120 in spaced-apart fashion. In this embodiment, the deflector plate 120 is carried on the support member 121. As clearly shown in FIG. 4, the deflector plate 120 has a central aperture 122 to allow for flow of the water therethrough. The deflector plate 120 is preferably made of water impermeable material, such as water impermeable resin, to prevent the water from flowing downwardly through other regions of the deflector plate 120 than the central aperture 122. The water impermeable plate 130 has a diameter smaller than an inner diameter of the housing, so that a circular gap 131 is defined therebetween.

Figure 2:
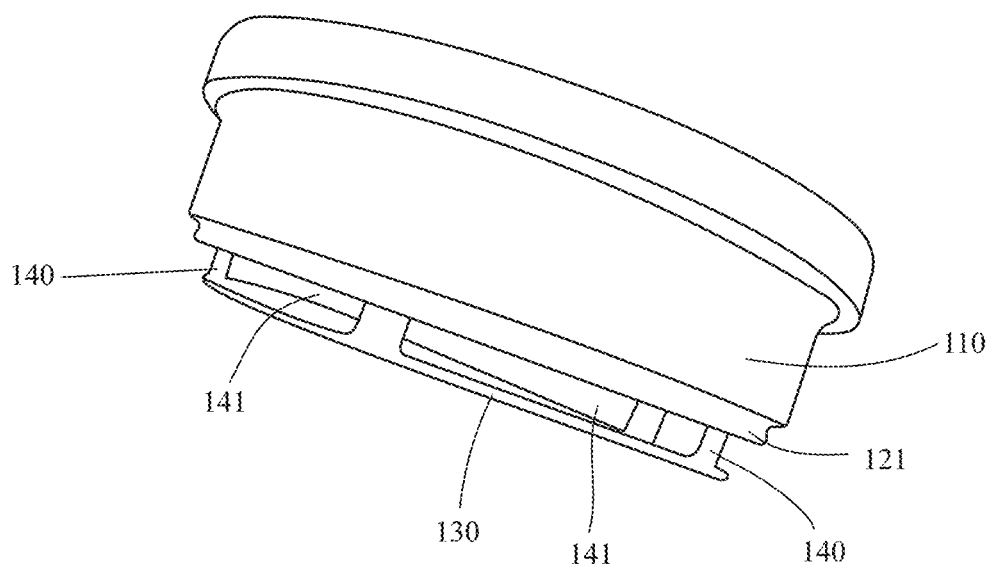
FIG. 2 is a perspective view showing the water filter of FIG. 1 with the third filter material layer removed.

As illustrated, a plurality of spaced ribs 140 are provided to connect an underside of the support member 121 with a top surface of the water impermeable plate 130 so as to define a plurality of windows 141 between the deflector plate 120 and the water impermeable plate 130 (see FIG. 2).

The ribs 140 may be connected with the support member 121 and the water impermeable plate 130 using any method known in the art, for example, they may be made of a plastic material and molded together integrally. The circular gap 131 is in fluid communication with the windows 141.

The water filter 100 further comprises a filter media for filtering the water to remove or reduce the concentration of bacteria, viruses and particulate matters. In particular, the filter media comprises a first filter material layer 151 useful as a coarse filter of the water flowing from the water inlets 114 into the filter. The first filter material layer 151 may consist of a first filter material, for instance, nylon or other suitable filtration material known in the art. The first filter material layer 151 is arranged in a space defined by the top cover 112 and the deflector plate 120 within the housing 110. The filter media further comprises a second filter material layer 152 comprising the second filter material which is arranged in a space defined together by the deflector plate 120 and the water impermeable plate 130. The second filter material is, for example, activated carbon, or ion exchange resin, or a mixture thereof.

Figure 3:
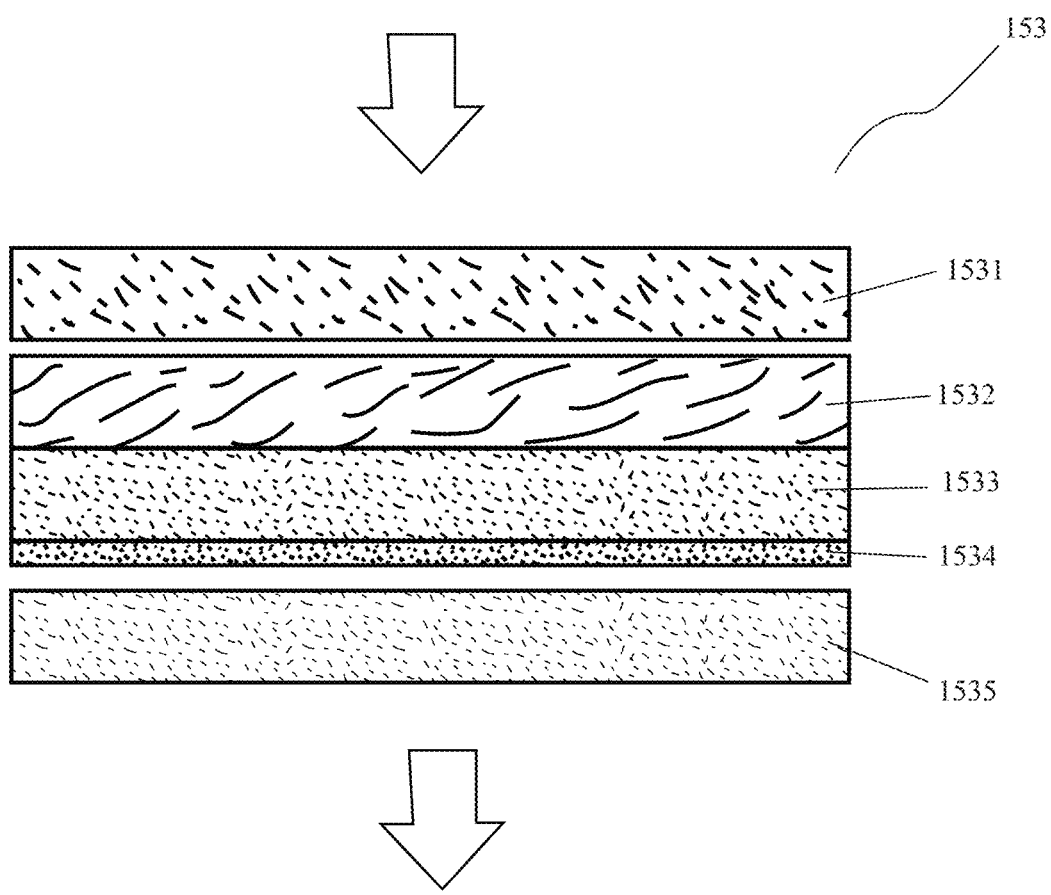
FIG. 3 is a schematic diagram showing a laminate of the third filter material layer useful in the water filter of FIG. 1.
Figure 4:
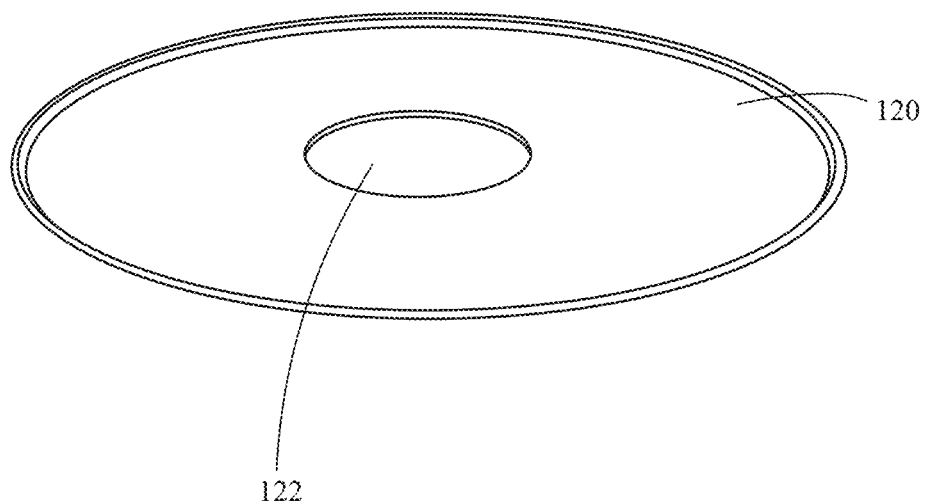
FIG. 4 is a top view of the deflector plate useful in the water filter of FIG. 1.

A feature of the water filter 100 is a third filter material layer 153 disposed to close the open bottom of the housing 110 by a method known in the art. For example, the third filter material layer 153 is held in a circular ring which may be fastened to the bottom of the housing 110. The water coming from the circular gap 131 is guided to flow into the third filter material layer 153 and out of the water filter 100. There is illustrated in FIG. 3 a particularly preferred embodiment of the third filter material layer 153. The third filter material layer 153 is generally a laminated structure. In the illustrated embodiment illustrated in FIG. 3, the laminated structure comprises a supporting layer 1531, a prefilter layer 1532, a nanofiber-coated layer 1533, a nanofiber layer 1534, and a protective layer 1535 seen in the water flow direction. The filtering ability of these layers increases from the supporting layer 1531 to the protective layer 1535. The supporting layer 1531 may be formed with polyethylene terephthalate (PET) having a basic weight in the range of about 10 to 80 gsm, preferably about 40 gsm. Besides PET, nylon, polypropylene (PP), other commercially available polymeric materials, or a combination thereof can be used. The prefilter layer 1532 may consist of absorbent fabric having a basic weight in the range of about 10 to 150 gsm, for example about 40 to 80 gsm, preferably 65 gsm. The nanofiber layer 1533 may be formed with a plurality of polymer-based nanofibers having a diameter in the range of 10 to 900 nanometer, which are capable of removing or reducing bacteria, viruses and heavy metals. The nanofiber-coated layer 1534 and the protective layer 1535 may be formed with PET having a basic weight in the range of about 5 to 70 gsm, preferably about 30 gsm, respectively. The water flows from the second filter material layer 152 through the circular gap 131 into this third filter material layer 153, and then runs through the nanofiber-based laminate filter layer to flow out of the water filter 100.

Advantageously, the three layers 1532, 1533, 1534 held between the two outer layers 1531, 1535 are laminated together using any method known in the art, for example hot-melt laminating methods. The laminated structure is then overlaid with the top supporting layer 1531, and is placed directly over the bottom protective layer 1535.

The water flows into the first filter material layer 151 via the water inlets 114, and the filtered water by the first filter material layer 151 flows down through the central aperture 122 of the deflector plate 120, and then is guided by the water impermeable plate 130 to deflect the flow of the water through transversely within the second filter material layer 152 towards the plurality of windows 141 formed by the ribs 140, the water impermeable plate 130 and the deflector plate 120. The filtered water by the second filter material layer 152 flows through the windows 141 and then into the circular gap 131 between the water impermeable plate 130 and the housing 110. Through the circular gap 131, the water would flow down to the third filter material layer 153 that is placed to close the open bottom of the housing 110. The extended water flow path follows the arrow direction shown in FIG. 1.

Because of using the design of the deflector structure, a flow path for the water to flow in the filter 100 is formed by the first filter material layer 151→the deflector plate 120→the central aperture 122 of the deflector plate 120→the second filter material layer 152→the plurality of windows 141→the circular gap 131→the third filter material layer 153→outside the housing 110 of the filter 100. The deflector structure enables to deflect and guide the water to flow in the tortuous path within the housing, thereby to significantly increase the length of the flow path, which in turn increases the residence time of the water in the filter 100 and the contact surface of water with the filter media for improved filtration effect, at the same time to greatly decrease the thickness of the filter 100. The first and second filter material layers 151, 152 are effective to remove and intercept chlorine, heavy metals and other particulate matters. The nanofiber laminated structure plays the role of effectively filtering out most nano-particles, bacteria, viruses present in the water while maintaining a low pressure drop.

The filter 100 is able to achieve the comprehensive depth filtration, and features the significant reduction in packing depth of the conventional filter materials like porous resin beads, activated carbon articles, due to the design of tortuous flow path. Therefore, the filter 100 can be of a compact configuration but still achieve reliable filtration performance.

Figure 5:
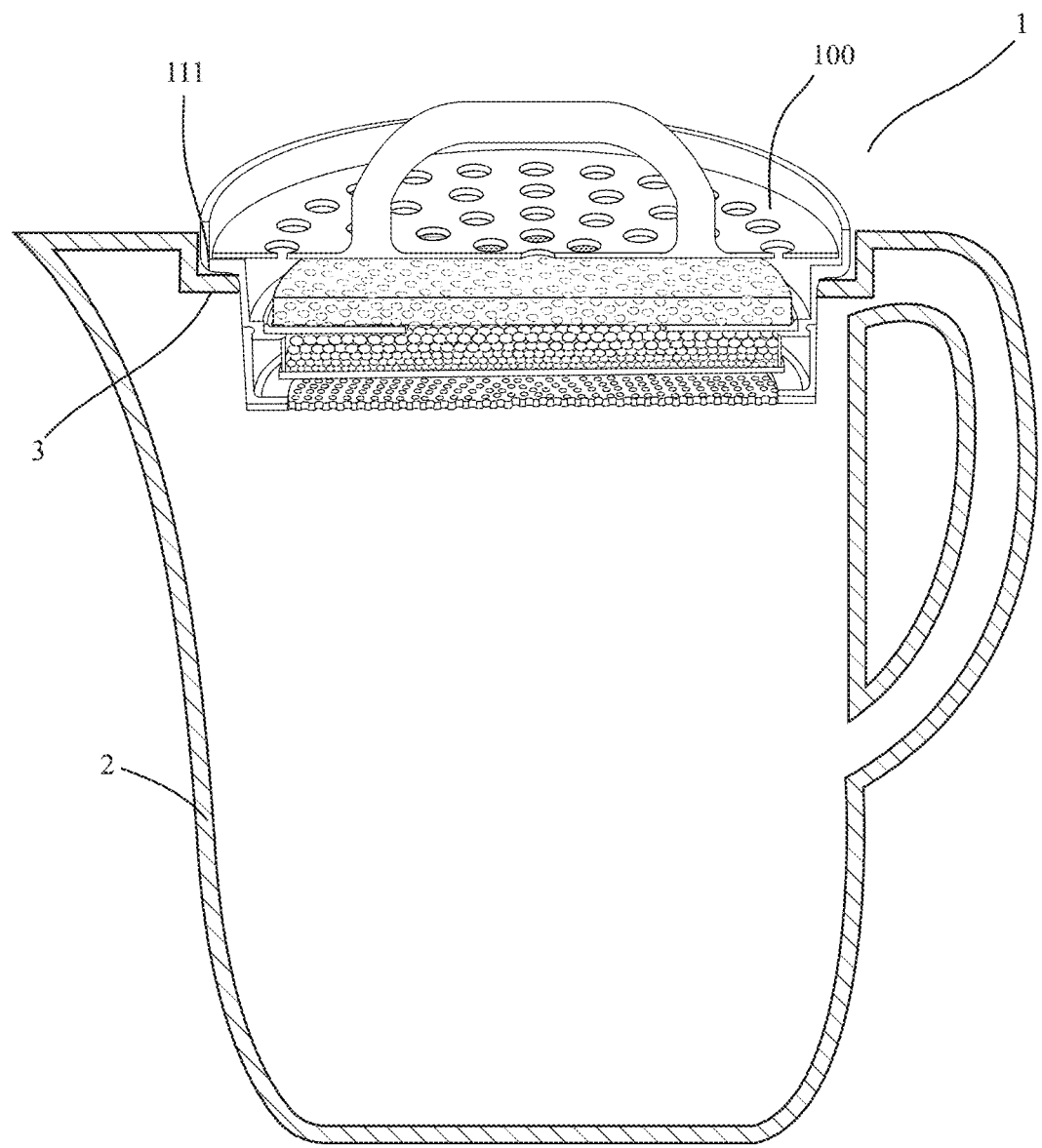
FIG. 5 is a perspective view of an exemplary pour through pitcher comprising the water filter of FIG. 1.

Now turning to FIG. 5, there is illustrated a water pitcher 1 comprising a reservoir 2 for storing filtered water, and a pitcher top. The reservoir 2 has an open-top rim 3. The pitcher top of the pitcher 1 is formed by the filter 100 discussed above and shown in FIGS. 1-3. The upper rim 111 of the housing 110 of the filter 100 is removably engageable with the open-top rim 3 of the reservoir 2, with the top cover 112 as the lid of the water pitcher 1. It would be appreciated that an additional lid member may be provided to cover the top cover 112 to avoid dust. The filtered water can flow from the filter 100 into the reservoir 2.

Figure 8:
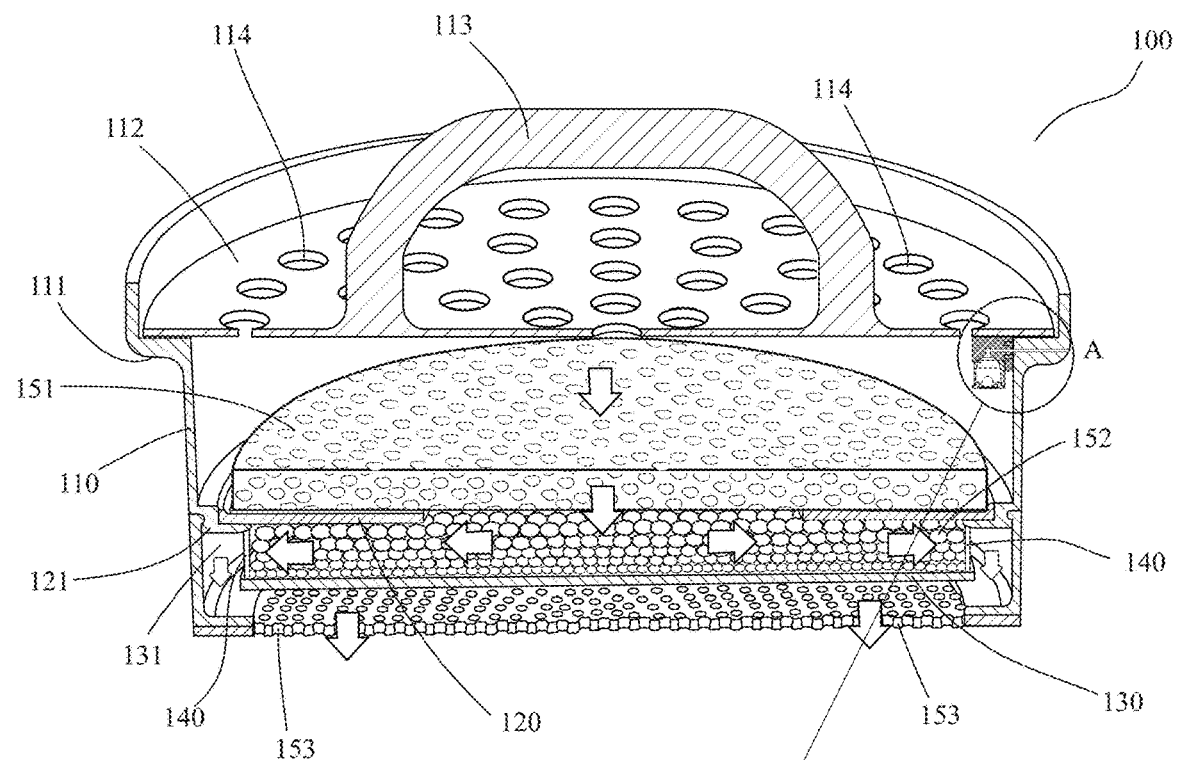
FIG. 8 is a cross-sectional view of the water filter of FIG. 1 with an air release device incorporated.

In some cases, it is likely that air inside the water filter 100 would not be able escape and remains in the interior of the water filter 100, which may have an impact on the water flow rate through the water filter 100. In order to solve this problem, an air release device 160 constructed consistent with a preferred embodiment of the invention is incorporated into the water filter 100 as shown in FIG. 8.

Figure 9:
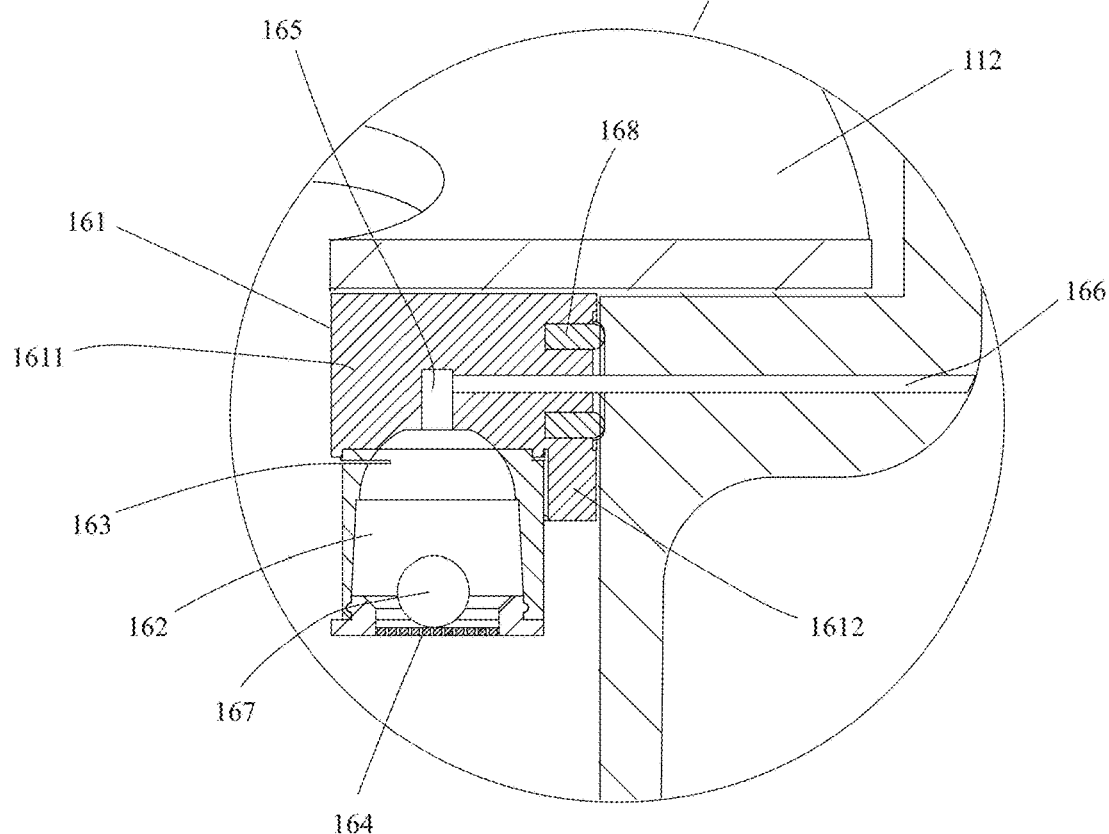
FIG. 9 is an enlarged view of Section A of FIG. 8 showing the air release device.
Figure 10A:
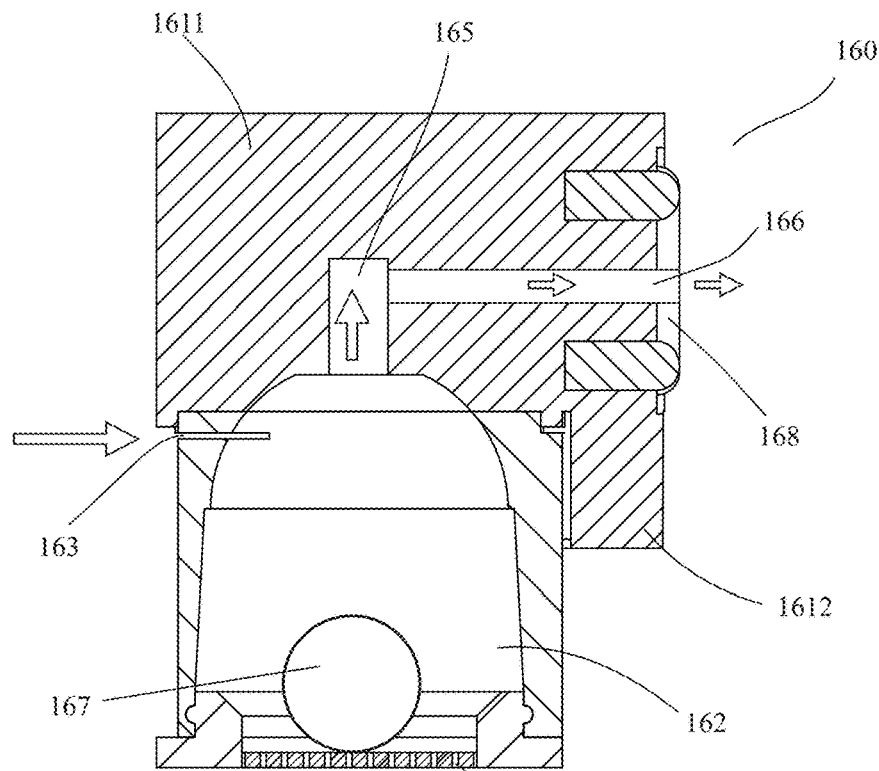
FIG. 10A is a cross sectional view of fluid communication between the inside and the outside of the water filter remains open by the air release device.
Figure 10B:
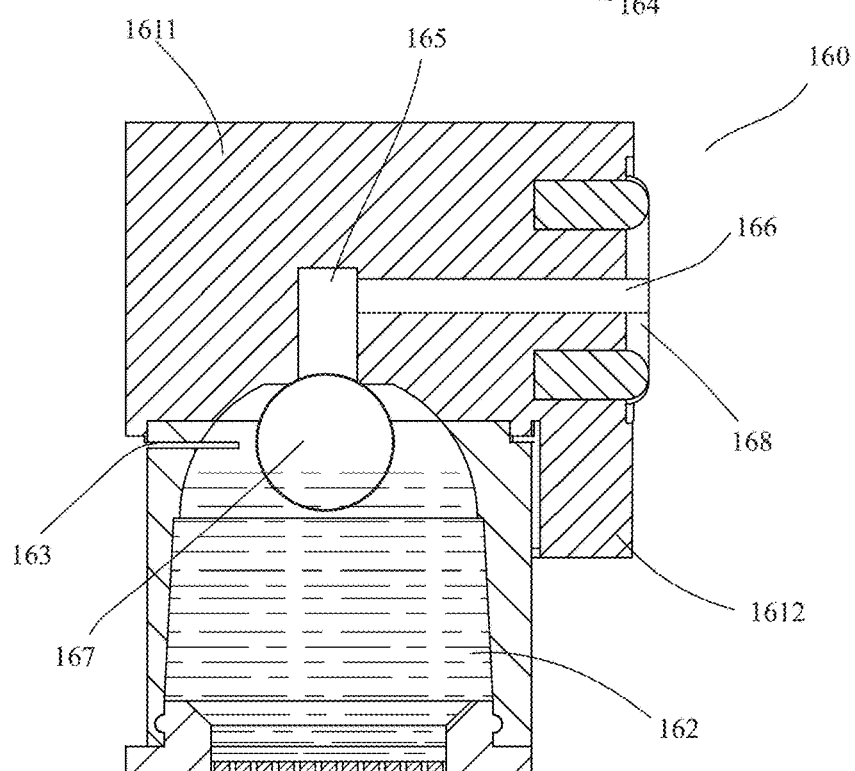
FIG. 10B is a cross sectional view of the fluid communication between the inside and the outside of the water filter is blocked by the air release device.

There is clearly illustrated the air release device 160 in FIGS. 9, 10A and 10B, which comprises a top portion 161 and an inner cavity 162 positioned beneath the top portion 161 and being in fluid communication with both the interior of the water filter 100 and the ambient environment. Specifically, the top portion 161 is a generally L-shaped, and includes a horizontal part 1611 and a vertical part 1612 attached to the side wall of the water filter 100 by, for example, molding together with the water filter 100. The air release device 160 defines the inner cavity 162, at least one air inlet 163 positioned at an upper portion of the inner cavity 162, one or more apertures or channels 164 are formed at a bottom of the inner cavity 162 to allow for inflow of the water from the water filter, and an air outlet 165 positioned on top of the inner cavity 161. The air remaining in the water filter 100 flows into the inner cavity 162 through the air inlet 163. The air outlet 165 leads to the ambient environment through a lateral passageway 166 relative to a longitudinal axis of the inner cavity 162. The passageway 166 extends through the top portion 161 and the side wall of the housing 110, and thus opens to the ambient environment.

A sealing member 168 is provided between the top portion 161 and the side wall of the housing 110 to create a sealing effect for the passageway 166 which extends through the top portion 161 and the side wall of the water filter 100. The provision of the sealing member 168 can effectively prevent any unwanted leakage of air or water from the passageway 166 into a gap between the top portion 161 and the side wall of the water filter 100.

The air release device 160 further comprises a floating ball 167 that is located in the inner cavity 162 and that is sized such that at least a part of the floating ball 167 can completely block the air outlet 165. The floating ball is able to float up and down to close or open the air outlet 165. Preferably, the inner cavity 162 gradually tapers in a direction from bottom to top in order to confine upward movement of the floating ball 167 towards the air outlet 165. The floating 167 is made of a plastic material, for example, that is capable of floating on the water. When the water level in the water filter 100 rises to reach the apertures or channels 164 at the bottom of the inner cavity 162, the water enters the inner cavity 162 through the apertures or channels 164 and acts on the floating ball 167 which is caused to ascend towards the air outlet 165 until a part of the floating ball 167 closes or blocks the air outlet 165 (see FIG. 10B). The air remaining in the water filter 100 flows into the inner cavity 162 and is discharged when the inner cavity 162 is filling with the water. The air outlet 165 always keeps open and thus the fluid communication between the inside and the outside of the water filter 100 remains until the water level rises to a blockage location of the floating ball 167 to block the air outlet 165. When the filter water flows down and out of the water filter 100 and the water level in the inner cavity 162 falls at the same time, the water exits from the inner cavity 162 through the apertures or channels 164, and the floating ball 167 descends and falls onto the bottom of the inner cavity 162, the air outlet 165 opens so that the fluid communication between the inside and the outside of the water filter 100 resumes.

Figure 11:
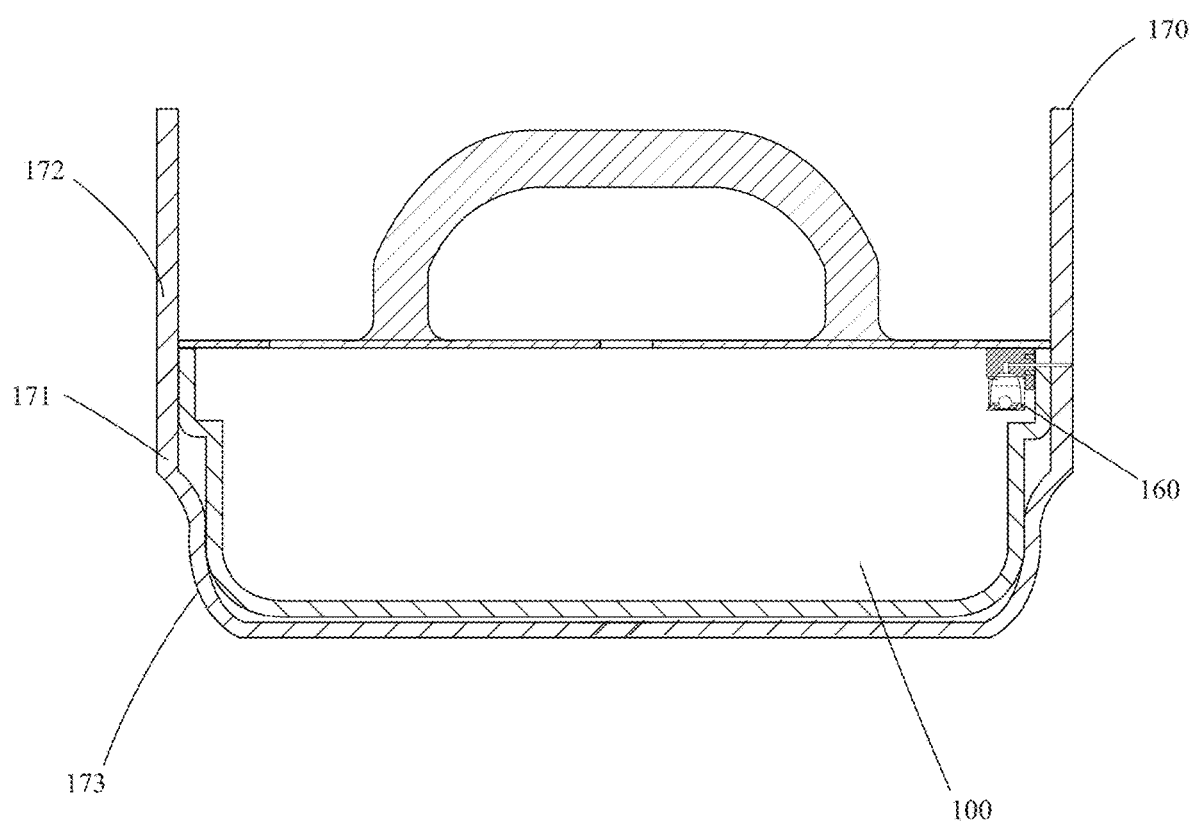
FIG. 11 is a cross sectional view of the water filter placed within a vessel adapted to contain the water ready for receiving filtering treatment.

A vessel 170 may be provided to accommodate the water filter 100 as shown in FIG. 11. The vessel 170 may be configured to have an open or perforated top, and an open or perforated bottom for water inflow and outflow. The vessel 170 comprises a lower portion 171 and an upper portion 172. The lower portion 171 has a downwardly tapering conical side wall 173 adapted to be held on a reservoir for storing the filtered water. The water filter 100 snugly sits within the lower portion 171. For the sake of clarity and simplicity, the internal structure of the filter media of the water filter is not shown in this figure. The upper portion 172 is adapted for containing a volume of water which is subject to purification treatment by the water filter 100.

Figure 6A:
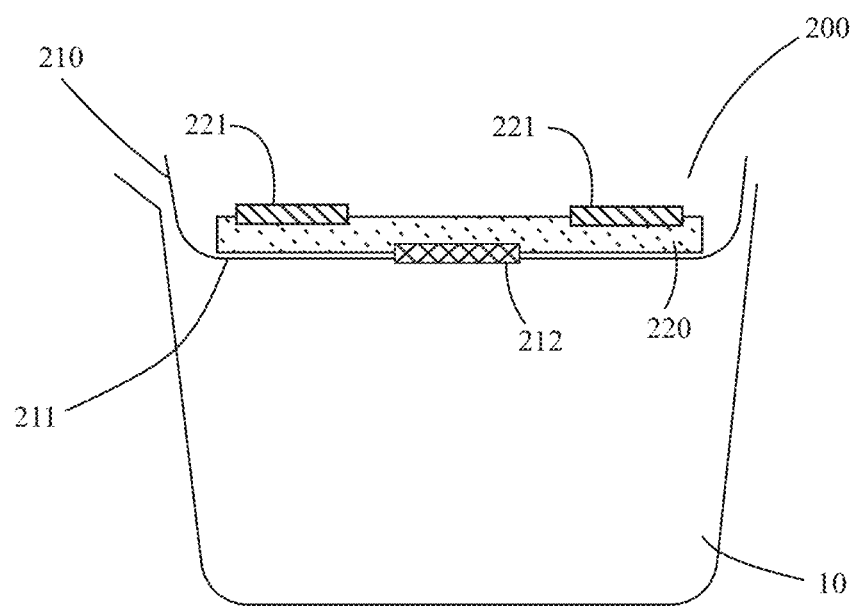
FIG. 6A is a schematic figure showing a water filter constructed consistent with a second embodiment of the invention.
Figure 6B:
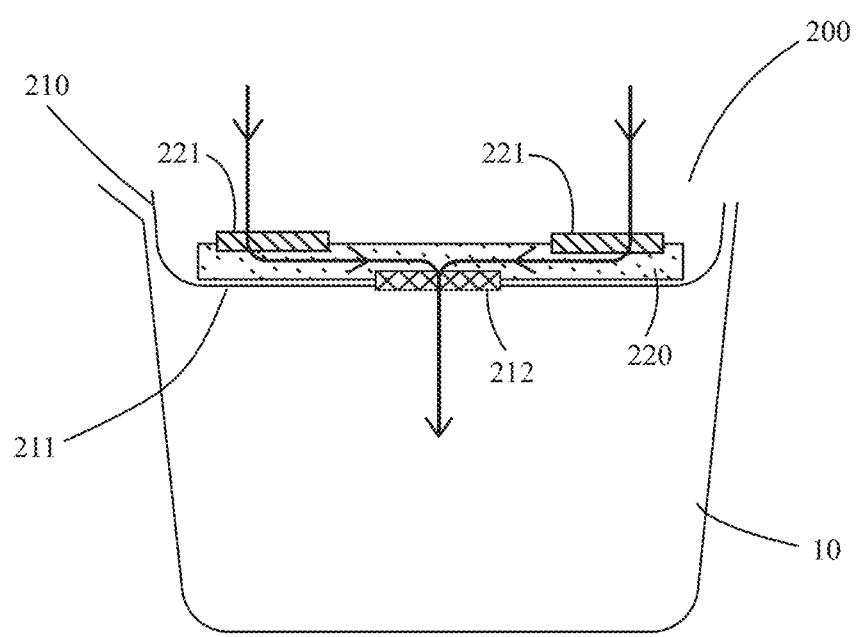
FIG. 6B is a schematic figure showing a flowing path for the fluid in the water filter of FIG. 6A.

FIGS. 6A and 6B provide in schematic manner a water filter 200 of more compact structure constructed consistent with the second embodiment of this invention. The water filter 200 comprises a filter media 220 provided in the disc form, and a housing 210. The filter 200 of this embodiment comprises two or more water inlets 221 arranged in the vicinity of a periphery of the top of the filter 200 to allow the water to enter into an interior of the filter media 220. The water filter 200 also comprises a housing 210 having an open top and a closed bottom 211 for housing the filter media 220. The housing 210 is made of a water impermeable material, and the closed bottom serves as a water impermeable plate to guide the water flow.

The closed bottom 211 of the housing 210 has an aperture centered on the bottom 211, which functions as a water outlet 212 to allow the water to flow out of the filter media 220. Because of the water impermeable housing 210, the water from the filter media 220 cannot flow out of the filter in a vertical direction. Rather, the water is guided to flow towards and leave from the water outlet 212 at the bottom 211 of the housing (FIG. 6B). As such the water inlets 221 are deviated in a staggered manner from the water outlet 212 to create an extended flow path along which the water flows in the filter media 220, and the length of the flow path is maximized in the interior of the filter. Therefore, the water cannot flow directly in a thickness direction (i.e. height direction) of the filter media 220, with a result of increased residence time of the water in the filter.

The filter media 220 may comprise a same filter material, or two or more different filter materials. Preferably, the filter media 220 is configured to have a multi-layered structure. Specifically, the filter media 220 comprises a first filter material to form a first filter material layer, a second filter material to form a second filter material layer, and a third filter material to form a third filter material layer. By way of example, the first filter material is nylon or filterable non-woven fabrics; the second filter material is selected from activated carbon, ion exchange resin beads, and a mixture thereof; and the third filter material is a nanofiber layer, for example the nanofiber-based laminate discussed above in the first embodiment. The non-woven fabric may be in the form of a multi-layer structure comprising polyacrylonitrile (PAN), Polyethylene naphthalate (PEN) or the like.

In some cases, the interior of the filter media 220 may be delimited by impermeable partitions to create a more tortuous flow path. Further, the filter media 220 may comprise a layer of nanofiber laminate, for example the one discussed in the first embodiment herein, to further increase the filtration efficiency.

Like the water filter 100 of the above first embodiment, the water filter 200 may be constructed to form a pitcher top adapted to be removably or pivotably engageable with an open-top rim of the water pitcher 10. The water is flowing into the filter media 220 via the water inlets 221, transversely passes through the interior of the filter media 220 towards the water outlet 212 due to the water impermeable housing 210, and then leaves out of the filter 200 into a reservoir of the pitcher 10. This flow path provides the extended residence time for the water to increase the filtration efficiency.

Figure 7A:
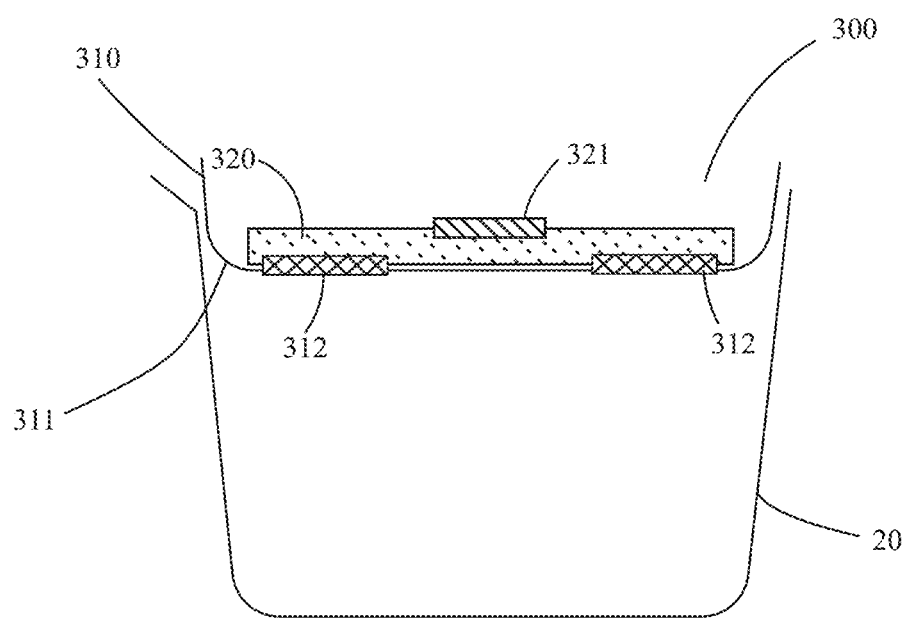
FIG. 7A is a schematic figure showing a water filter constructed consistent with a third embodiment of the invention.
Figure 7B:
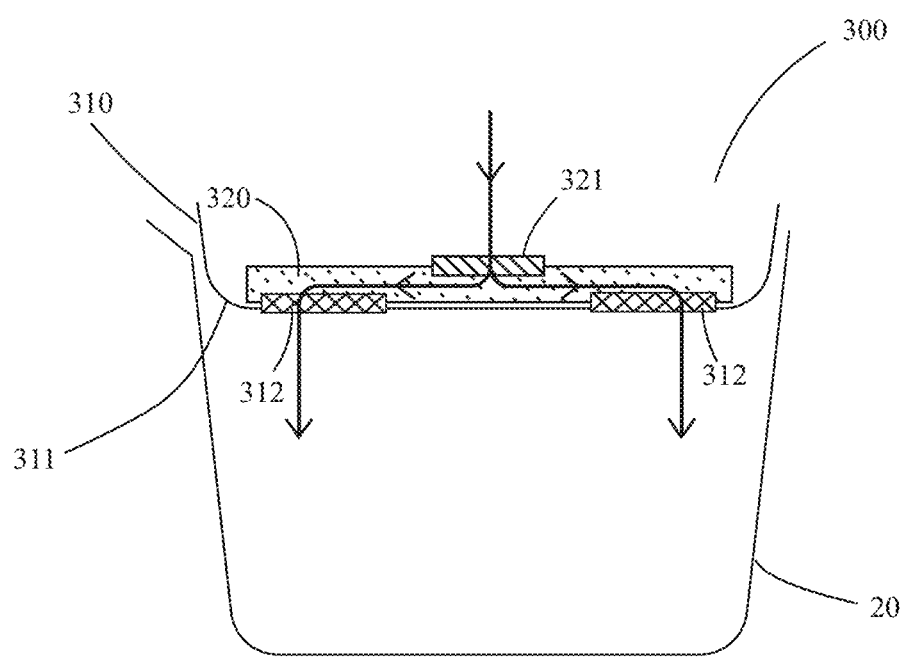
FIG. 7B is a schematic figure showing a flowing path for the fluid in the water filter of FIG. 7A.

FIGS. 7A and 7B provide in schematic manner a water filter 300 constructed consistent with the third embodiment of this invention. The water filter 300 of this embodiment is substantially same in structure as the water filter 200 of the above second embodiment, but differs in the arrangement of water inlets and water outlets. As illustrated, the water filter 300 comprises a filter media 320 and a water impermeable housing 310 for housing the filter media 320. Only one water inlet 321 is centered in the filter media 320 to allow for flow of the water into an interior of the filter media 220. The housing 310 has a closed bottom 311 provided with two or more water outlets 312 arranged in the vicinity of a side wall of the housing 311, and the water is guided to flow towards and leave from the water outlets 312 adjacent to the side wall of the housing (FIG. 7B). Therefore, an extended flow path is created for the water, with a result of increased residence time of the water in the filter.

Again, the water filter 300 may be constructed to form a pitcher top adapted to be removably or pivotably engageable with an open-top rim of the water pitcher 20.

The filters of the invention can be in the disc form, depending on the size and application of the water container. The filters 200, 300 preferably have a ratio of width to depth in the range of 1:1, 2:1, 3:1, 4:1, 5:1, 6:1, 8:1, 10:1, 12:1, 15:1, 18:1, 20:1, 25:1 to 30:1.

Therefore, the foregoing provides a fluid filter which is constructed compactly such that the filter does not submerge into the filtered water, and does not occupy significantly the internal space of the water container. Due to the compact structure, the fluid filter of the invention enables to increase flow rate of the fluid and maximize the space usage for the filtered fluid. In addition, the extended flow path leads to an extended period of residence time within interior of the filter media, which helps to increase the chance of interaction between the filter materials and the fluid during filtration process. Accordingly, filtration efficiency can be enhanced.

Figure 12:
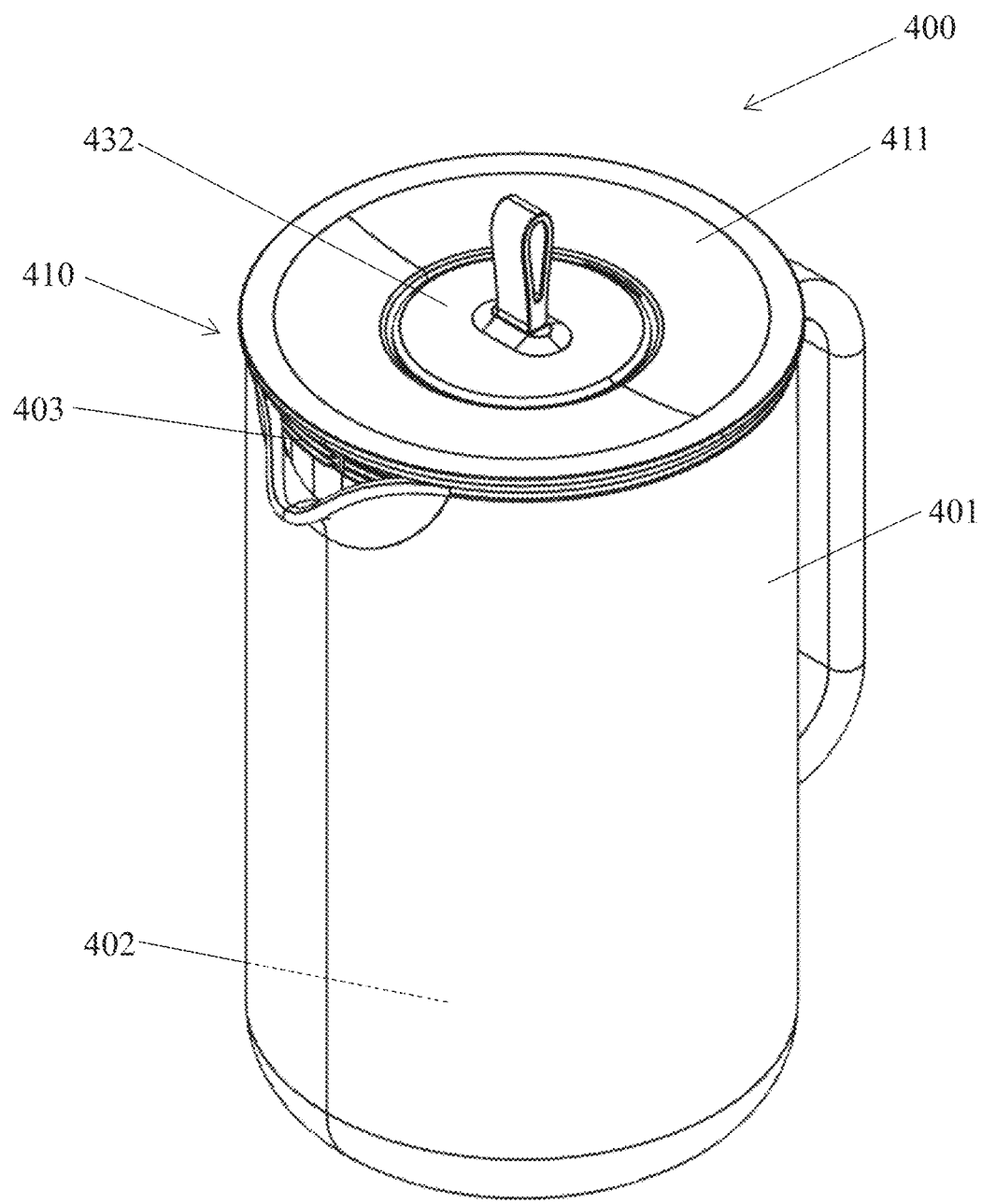
FIG. 12 is a perspective view of a water filtration pitcher constructed consistent with a fourth embodiment of the invention.
Figure 13:
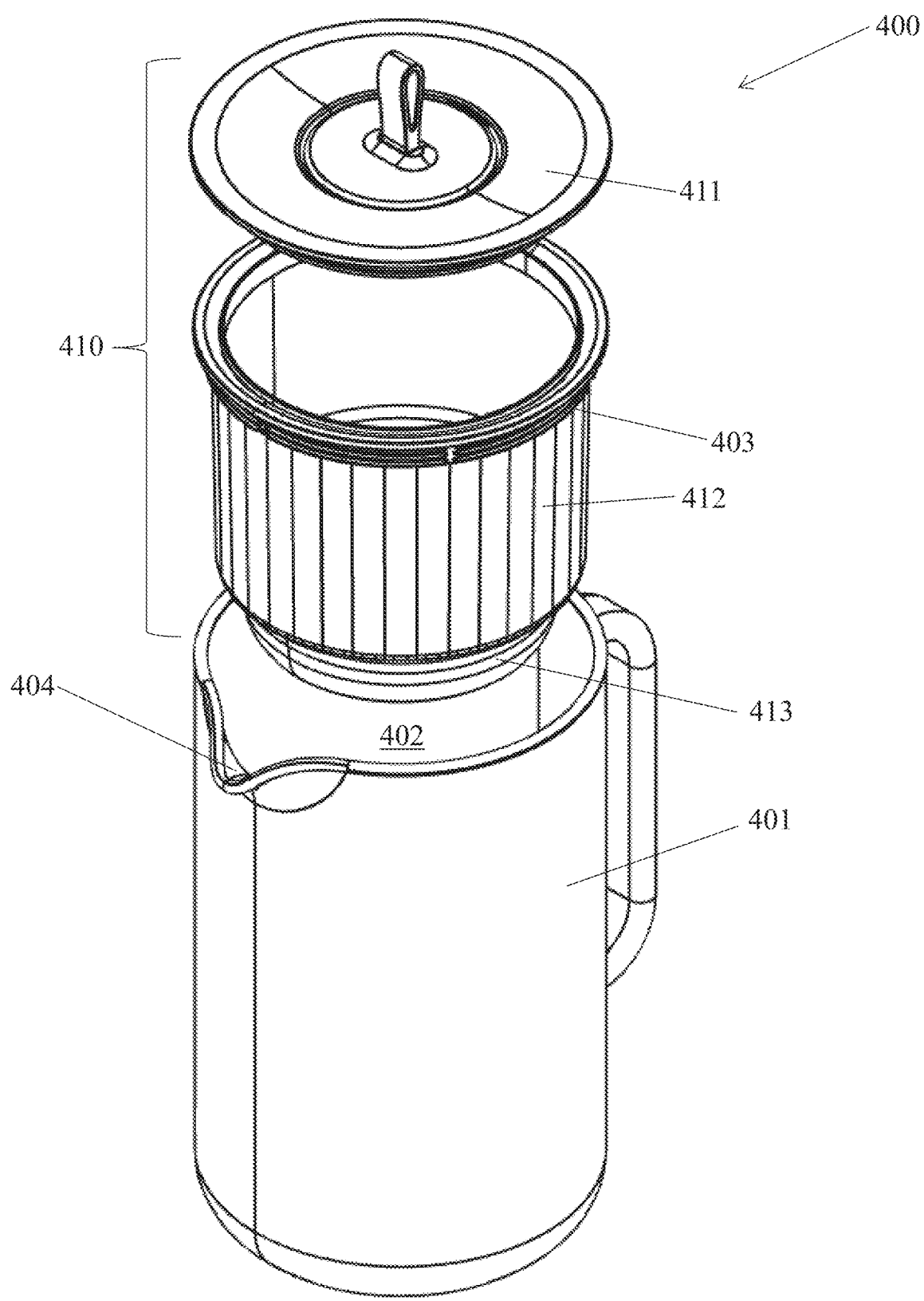
FIG. 13 is an exploded view of the water filtration pitcher of FIG. 12.

FIGS. 12 to 19 illustrate a filtration device 410 and a water filtration pitcher 400 constructed consistent with another embodiment of the present invention. Referring to FIG. 12 and FIG. 13, shown is a water filtration pitcher 400 incorporating a re-installable filtration device 410. Preferably, the filtration device 410 is mountable in an opening of a container, for example, a water pitcher body 401, defining a reservoir portion 402 within the pitcher body 401 and downstream the filtration device 410. The reservoir portion 402 would have a fluid capacity exceeds that of the filtration device 410, ensuring a sufficient volume of filtered water is maintained in readiness for dispensing. The filtration device 410 includes a lid 411 which forms a closure for both the filtration device 410 and the pitcher body 401. The water filtration pitcher 400 is engineered to facilitate the pouring of filtered water while the filtration device 410 remains engaged. A resealable junction 403 may be established between the filtration device 410 and the pitcher body 401 to maintain the potability of the filtered water. According to the present embodiment, the filtration device 410 is suitable for filtering contaminants not limited to, micro-sediments, and harmful chemical substances, such as fluoride and chloride.

Figure 14:
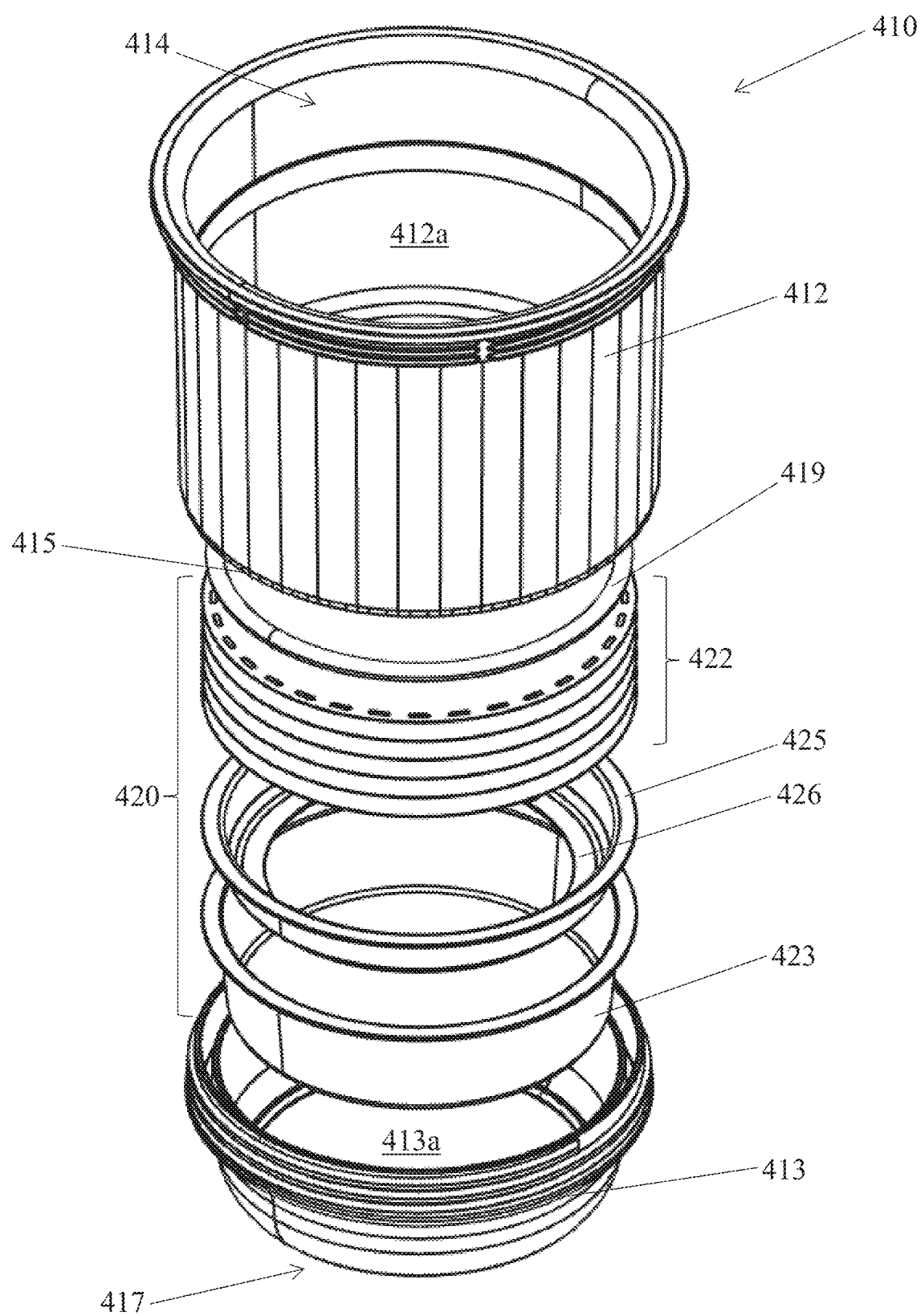
FIG. 14 is an exploded view of a filtration device for use in the water filtration pitcher of FIG. 12.

The general structure of the filtration device 410 is depicted in FIG. 14. The filtration device 410 includes a housing composed of two interconnectable sections, namely, a first housing portion 412 and a second housing portion 413. The first and second housing portions are designed to be arranged in a stacked configuration, with the first housing portion 412 positioned atop the second housing portion 413. The two housing portions are joinable by means of cooperating threads or other known fastening mechanisms. The first housing portion 412 is typically cylindrical, delineating a first internal space 412a and an opening at its upper end. The opening functions as an entry point, i.e., a filter inlet 414, for the ingress of unfiltered fluid. At the bottom of the first housing portion 412, a base 415 is furnished with a plurality of apertures 416 (see FIG. 16) designed to facilitate the flow of fluid. In the present instance, these apertures 416 are configured as longitudinally aligned, oblong slots distributed uniformly across the base 415. Consequently, fluid awaiting filtration is temporarily housed within the first internal space 412a before being directed downstream into the second housing portion 413.

The second housing portion 413 of the filtration device 410, when coupled to the first housing portion 412, establishes a second internal space 413a that is situated downstream relative to the first internal space 412a. The second housing portion 413 is specifically configured to receive the flow of fluid from the first housing portion 412 after it has passed through the aforementioned apertures 416. The second housing portion 413 is structured to facilitate one or more stages of filtration process. The second internal space 413a within this portion is delineated to house one or more filter medias responsible for purification of the fluid. The second housing portion 413 is provided with a filter outlet 417 located at its downstream end to permit evacuation of the filtered fluid, utilizing gravity to its advantage.

In addition to its functional attributes, the second housing portion 413 is configured for seamless integration with the first housing portion 412, maintaining the integrity of the filtration device 410. This ensures that there is no leakage between the two housing portions and that all fluid passes through the filter media as intended. Situated within the second housing portion 413 lies the filter element assembly 420. The filter element assembly 420 is strategically positioned within the second internal space 413a of the filtration device 410.

The filter element assembly 420 is preferably designed as a modular filter cartridge, which is intended for single or disposable use. This modular cartridge is crafted to be easily inserted and replaced within the second internal space 413a of the filtration device 410, offering a convenient solution for users to maintain the effectiveness of the filtration system. The single-use design of the cartridge emphasizes user convenience and ensures optimal filtration performance by eliminating the need for cleaning or maintenance of the filter media. Once the filter's effective lifespan is reached, the entire cartridge can be disposed of and replaced with a new one, thereby also minimizing the user's direct contact with contaminants that have been captured by the filter. This modular design not only simplifies the user experience but also allows for the entire filtration device to remain operational over an extended period, with only the cartridges being cycled out. The present embodiment presents an eco-friendlier alternative to disposing of the entire filter element assembly 420 once its filtration capacity is diminished. Furthermore, this design can be advantageous for ensuring consistency in water quality, as each new cartridge will contain fresh filter media prepared to operate at peak efficiency. In addition, the modular cartridge may be constructed with materials that are biodegradable or recyclable, in keeping with environmental considerations. The choice of materials and design of the cartridge should be such that it aligns with regulatory standards for single-use water filtration devices and can be easily manufactured, stocked, and distributed without requiring special handling procedures.

Figure 15:
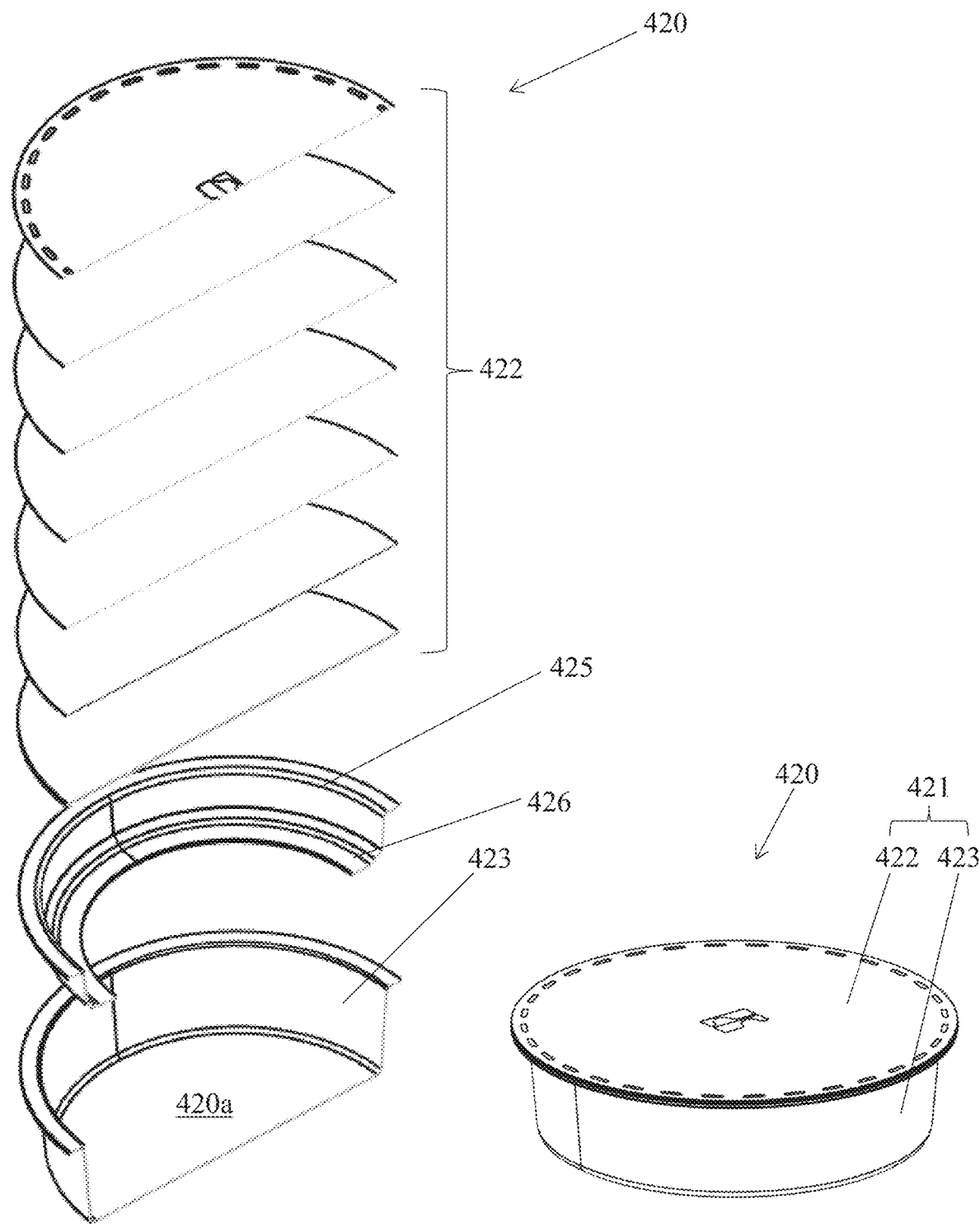
FIG. 15 is a perspective view and an exploded view of a filter element assembly in the filtration device in FIG. 14.

As specifically illustrated in FIG. 15, the filter element assembly 420 includes an enclosure 421 formed by joining a first filter media 422 with a holder 423. The holder 423, optimally configured as an open-top receptacle, is intended to be integrally bonded with the first filter media 422. The enclosure 421 delineates a compartment 420a for effectively encapsulating one or more subsequent filter medias. The enclosure 421 essentially serves as the outer periphery layer of the filter element assembly 420. The enclosure 421 may be constructed from a material that permits the flow of fluid while precluding the passage of particulates. This permeable construction ensures that fluid can enter the compartment 420a while a portion of the contaminants are captured by the one or more filter medias. As shown, the first filter media 422 is located upstream of the compartment 420a and serves as a preliminary stage of filtration. The first filter media 422 is designed to intercept larger particulates and sediments, thereby enhancing the longevity and effectiveness of the subsequent filter media. The first filter media 422 may comprise a plurality of filter substrates in circular disc shape, constructed from materials to be discussed in the following section. These substrates may be arranged in a layered, stacked configuration and constitute the upper segment of the enclosure 421.

The first filter media 422 utilized in the preliminary stage of the filtration process is critical as it provides the initial treatment of the water. Preferably, polymer-based nanofibers may be selected for its durability, effectiveness in particle retention, and compatibility with the overall design of the filtration device. Polymer-based nanofibers are highly effective as a first filter media due to their exceptional surface area-to-mass ratio, which enhances filtration efficiency. The intricately porous structure of these fibers allows for high water permeability while trapping contaminants, and their mechanical robustness ensures durability. They can be chemically tailored to target specific impurities, offering versatility across different filtration applications. Additionally, the lightweight and compact nature of nanofiber filters facilitates easy handling and replacement, while contributing to a lower pressure drop across the filter, thereby optimizing energy use during the filtration process.

As a non-limiting alternative, nylon may be chosen as the material for the first filter media due to its excellent mechanical properties and resilience. Nylon meshes are characterized by their uniform pore sizes, which are instrumental in consistently removing particles of a specific size range. This predictability in performance is vital for maintaining the quality of the filtered water. The primary role of the first filter material is to remove larger particulates from the water, such as sediment, silt, and rust, which can negatively impact the taste and appearance of water and potentially damage downstream filter media. As discussed, nylon excels in this role due to its strength and ability to withstand a substantial load of particulates without tearing or deforming. The first filter media should be chemically inert in the face of most contaminants found in water. It should also thermally stable, which ensures that its filtration capability remains unchanged across a range of temperatures typically encountered in water filtration applications. Alternatively, non-woven fabrics may also be used as the material for the first filter media. Non-woven fabrics provide a depth filtration mechanism, trapping particles not just on the surface but also within the volume of the material. This increases the contaminant-holding capacity of the filter. Non-woven fabrics are also preferred for their inherent ability to maintain water flow rates, even as they capture particulates, due to their lofty and open structure. The versatility of non-woven fabrics allows for the integration of various polymer fibers, such as polyacrylonitrile (PAN) or polyethylene naphthalate (PEN), to tailor the material properties to specific filtration needs. PAN offers excellent chemical resistance and thermal stability, while PEN provides added durability and resistance to UV light and other environmental factors. Nylon and non-woven fabrics provide a combination of mechanical strength, filtration efficiency, and chemical stability, ensuring the filtration device performs optimally in a variety of water conditions and usage scenarios.

To ensure the fluid permeable characteristic of the enclosure 421, the holder 423 is fabricated from materials that permit the passage of fluid while retaining the filter media housed therein. For instance, the holder 423 may be composed of a porous material or a mesh constructed from a fluid-permeable polymer such as polyethylene or polypropylene. These materials are selected for their ability to support the structure of the filter element assembly 420 while also allowing fluid to flow through with minimal resistance. The choice of fluid-permeable materials for the holder 423 is crucial as it dictates the efficacy of the filtration process. The porosity of the holder 423 must be fine enough to prevent the passage of unwanted contaminants, yet not overly restrictive as to impede the flow rate of the fluid. Advantageously, the material which makes up the holder 423 should exhibit a high degree of chemical and biological inertness to ensure that it does not impart any undesirable flavors or compounds into the filtered fluid, nor support the growth of microorganisms.

In an embodiment, housed within the enclosure 421 lies the second filter media 424. For sake of clarity and simplicity, the second filter media is not shown except in FIG. 19. Preferably, the second filter media 424 is a granular filter material and is primarily responsible for advanced stage of filtration, which may include but not limiting to the absorption or ion exchange processes necessary to remove finer particulates, certain chemicals, and possibly biological contaminants from the water. In an embodiment, the second filter media 424 may incorporate activated carbon or similar adsorbent materials. Activated carbon has an exceptionally porous form of carbon that has been processed to have small, low-volume pores that increase the surface area available for adsorption or chemical reactions. Due to its extensive pore network and structure, activated carbon is ideal for trapping organic chemicals and chlorine-based substances that may contribute to taste and odor issues in water. The primary function of the activated carbon in the second filter media 424 is adsorption, which is the adhesion of atoms, ions, or molecules from a gas, liquid, or dissolved solid to a surface. In the context of water filtration, contaminants are attracted to the surface of the activated carbon and held in place, thereby being removed from the water that passes through. The second filter media 424 is particularly effective at removing contaminants such as chlorine, volatile organic compounds (VOCs), certain pesticides and industrial solvents, and byproducts of water chlorination like trihalomethanes (THMs). The activated carbon is typically held within a mesh or fabric that allows water to pass while containing the fine particles of carbon. The design of the holder 423 is tailored to maximize contact between the water and the activated carbon, often by increasing the surface area through a pleated or granulated design, which ensures an efficient and uniform flow of water through the media.

Other than activated carbon, it is appreciated that similar adsorbent materials can be used in the second filter media. These include materials like activated alumina, which is effective at removing fluoride, arsenic, and selenium from water; ion exchange resins, which can selectively remove ions from the water, and others like zeolites, which are microporous, aluminosilicate minerals commonly used as commercial adsorbents. According to an embodiment, the second filter media 424 may comprise activated carbon, ion exchange resin beads, and a mixture thereof.

As shown in FIG. 15, the structural integrity and geometric configuration of the enclosure 421 are maintained by a resilient and sturdy support member 425 strategically situated within the enclosure, upstream of the second filter media 424. As depicted, the enclosure 421 has a complementary shape with respect to the second internal space 413a within the second housing portion 413. The support member 425 is instrumental in preserving the shape of the enclosure 421 against hydraulic pressures encountered during the water filtration process. Specifically, the support member 425 may be an annular shape component, constructed from a material that exhibits rigidity or stiffness, such as plastic. The rigidity provided by the support member 425 is effective for reinforcing the enclosure 421, ensuring that it retains its designated cylindrical drum-like contour throughout its service life. Advantageously, the support member 425 may be integrated with a deflector 426. The function of the deflector 426 is to control flow dynamics within the enclosure 421. Preferably, the deflector 426 is an annular lip located at its downstream end of the support member 425. The annular lip is angled downward to direct the flow of fluid away from the circumferential side of the enclosure 421.

Specifically, the deflector 426 is configured to reroute a portion of the fluid that has transited through the first filter media 422 away from the circumferential side of the enclosure 421 before entering the second filter media 424. By doing so, it promotes a more even distribution of the fluid across the second filter media 424 and mitigates the risk of channeling. Channeling refers to the phenomenon where the fluid creates and follows the path of least resistance through a filter media, often leading to uneven utilization of the media. When channeling occurs, the fluid bypasses much of the filtering material by flowing through these channels or tunnels that have formed within the filter media, of which in the present case, the gap between the circumferential side and the second filter media 424. Channeling may lead to uneven utilization of the filter media, as water bypasses much of it and reduces the overall effectiveness of the filtration process. This phenomenon results in shorter filter life, compromised water quality due to inadequate contaminant removal, and potential increases in system maintenance costs. The use of the deflector 426 ensures a more effective filtration process as water is guided uniformly through the second filter media 424, thereby optimizing the removal efficiency of the remaining contaminants.

In a preferred embodiment, the filter element assembly 420 may be fabricated by using any common bonding technique in the art to fuse the first filter media 422 and the holder 423 into a unified enclosure 421. Specifically, ultrasonic welding is used for bonding the first filter media 422 and the holder 423. Based on the described configuration, the filter element assembly 420 includes the enclosure 421 constituted by the first filter media 422 and the holder 423. Additionally, the filter element assembly 420 includes the second filter media 424 and the support member 425 that integrates the deflector 426, all of which are encapsulated within the enclosure 421. Advantageously, the filter element assembly 420 can be realized as a single-use, replaceable cartridge. This integrated cartridge design simplifies maintenance and upholds water quality standards by allowing users to effortlessly exchange the cartridge as needed, without requiring specialized tools or advanced technical knowledge.

Figure 16:
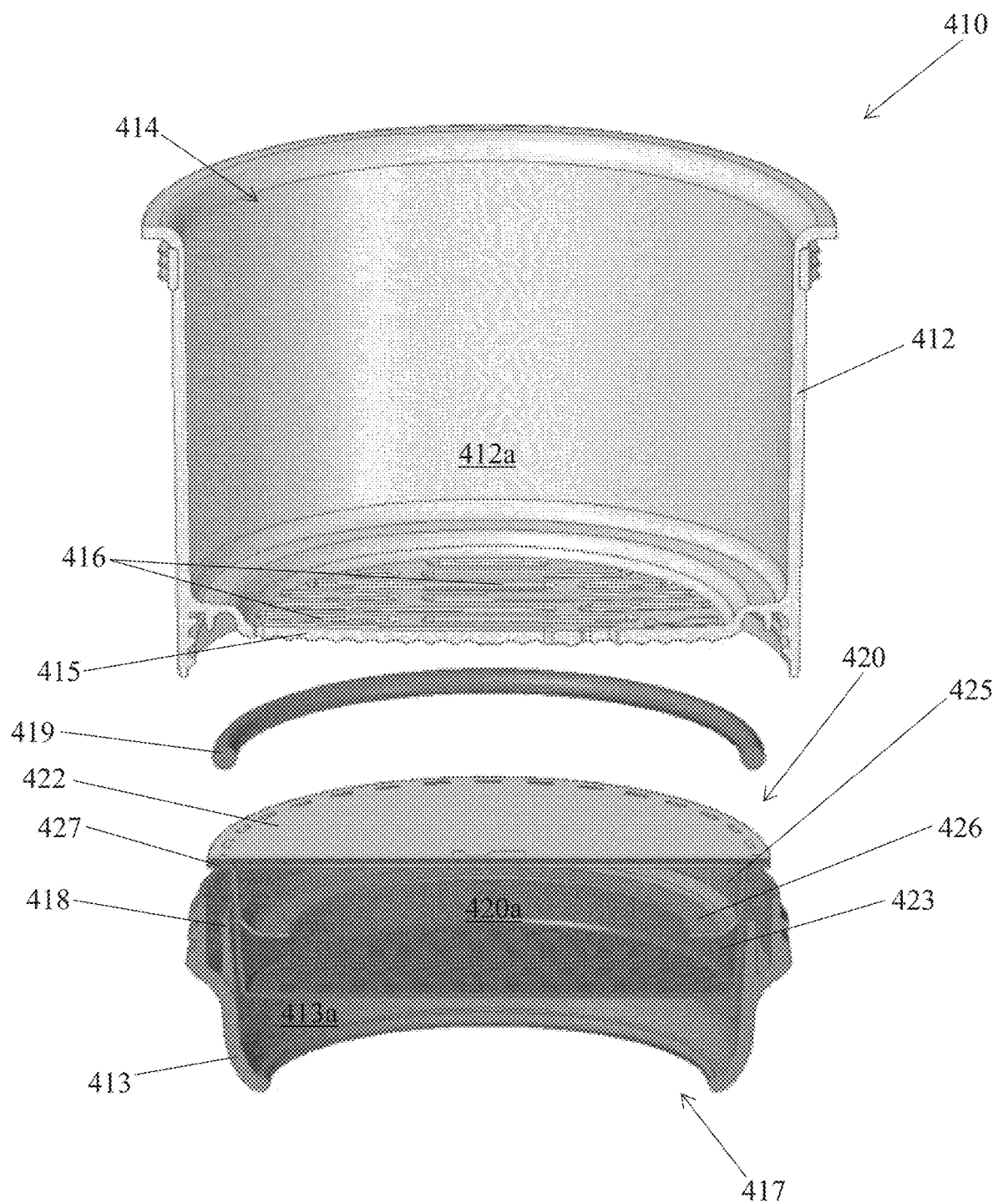
FIG. 16 is an exploded sectioned view of the water filtration device.

According to the configuration of the filtration device 410 as shown in FIG. 16, the second housing portion 413 is removably coupled to the first housing portion 412 via a threaded connection. The filter element assembly 420 is held in place by this threaded connection between the two housing portions. Specifically, the filter element assembly 420 features an annular flange 427, designed to interface with an annular ridge 418 located on the second housing portion 413. When the first and second housing portions are joined, the annular ridge 418 comes into contact with the annular flange 427 as well as the first housing portion 412, ensuring a secure assembly.

Preferably, a sealing configuration is positioned between the base 415 of the first housing portion 412 and the filter element assembly. This configuration is designed to ensure that the fluid dispensed from the first housing portion is channeled directly into the filter element assembly, avoiding potential leaks to the surrounding environment. Specifically, an annular gasket 419 is employed to provide a seal between the base 415 of the first housing portion 412 and the filter element assembly 420. The integrity of this seal is further enhanced by the compression of the annular gasket 419, which occurs when the first and second housing portions 412, 413 are engaged.

The intended configuration of the first and second internal spaces 412a, 413a, such as their respective shape and volume, is instrumental in determining the flow rate and the overall efficiency of the filtration process. This detailed design consideration ensures that the fluid remains in contact with the filter medias for an adequate amount of time, thereby maximizing the removal of contaminants as it transitions from the first internal space 412a to the second internal space 413a before reaching the filter outlet 417.

Figure 17:
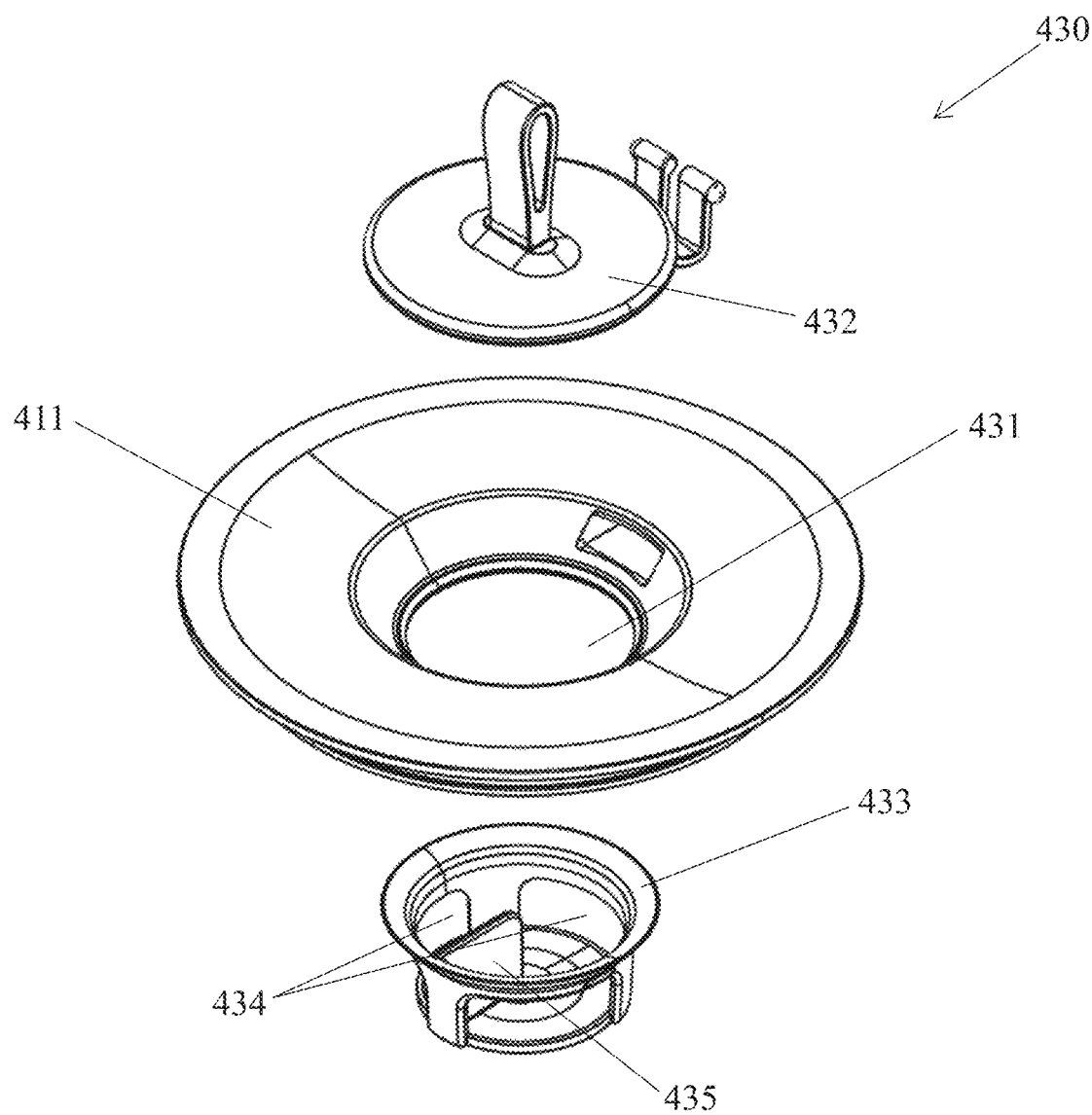
FIG. 17 is an exploded view of a lid assembly.

In a further embodiment, the filtration device 410 additionally includes a lid assembly 430 configured to provide a closure for the filter inlet 414 of the first housing portion 412. As illustrated in FIG. 17, the lid assembly 430 has a lid 411 provided with a centrally located re-closable inlet 431, with a pivotable closure member 432 designed to seal the re-closable inlet 431. Preferably, the re-closable inlet 431 is contoured to taper towards the center, aiding in directing fluid flow thereto. A removable sieve 433 may be provided and positioned directly downstream of the re-closable inlet 431, which serves to preliminarily filter the fluid before it enters the first internal space 412a. The sieve may be provided with one or more slots 434 to facilitate flow of water down into the first internal space 412a. A handle 435 is disposed within the sieve for facilitating grasping of the sieve during removal or installation. Preferably, a mesh may be provided at each of the slots 434. With the lid assembly 430 mounted, the filtration device 410 serves also as a closure for the top opening of the water filtration pitcher 400, as previously shown in FIG. 12.

Figure 18:
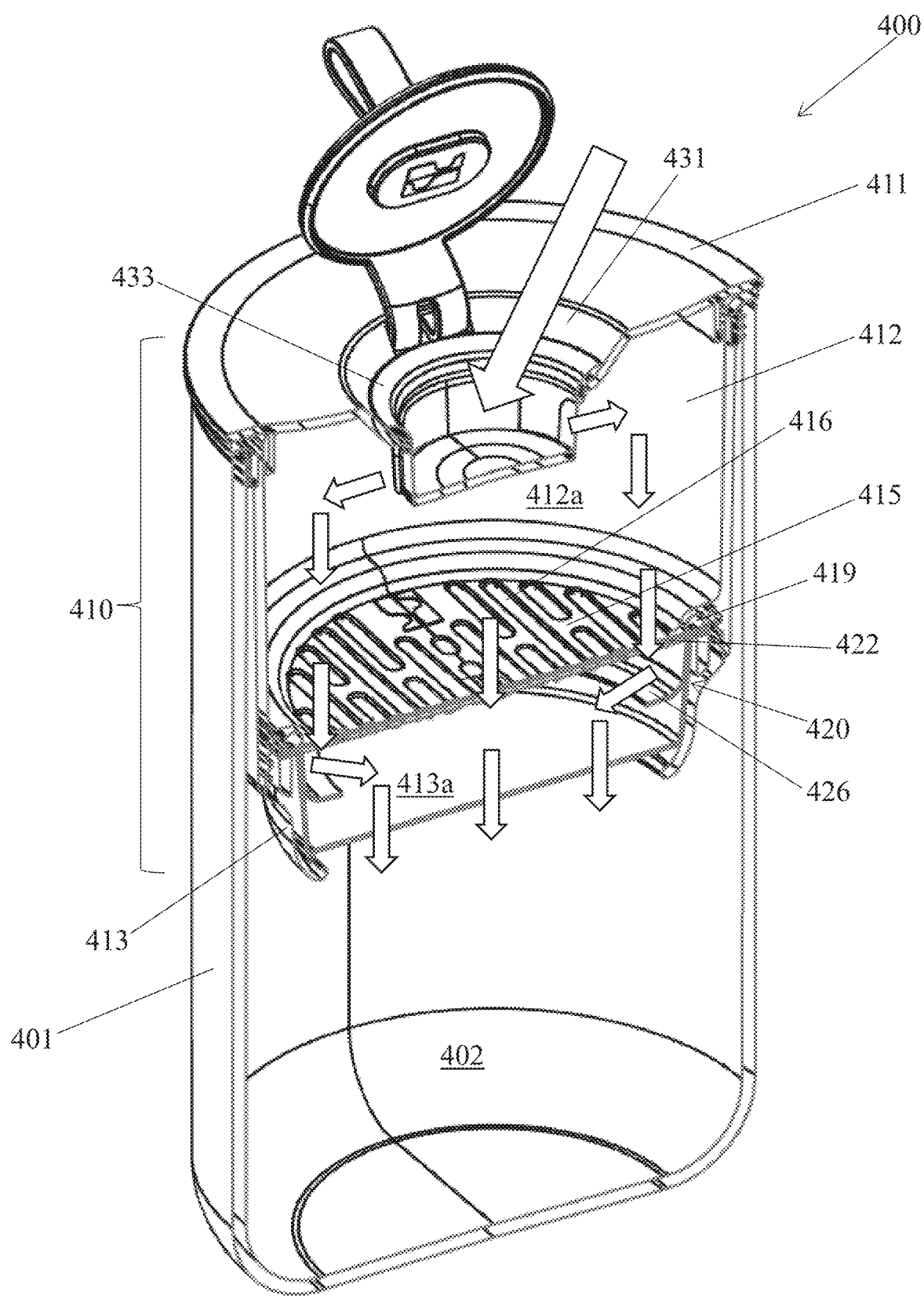
FIG. 18 is a sectioned view of the water filtration pitcher, illustrating the flow mechanism within the pitcher body.
Figure 19:
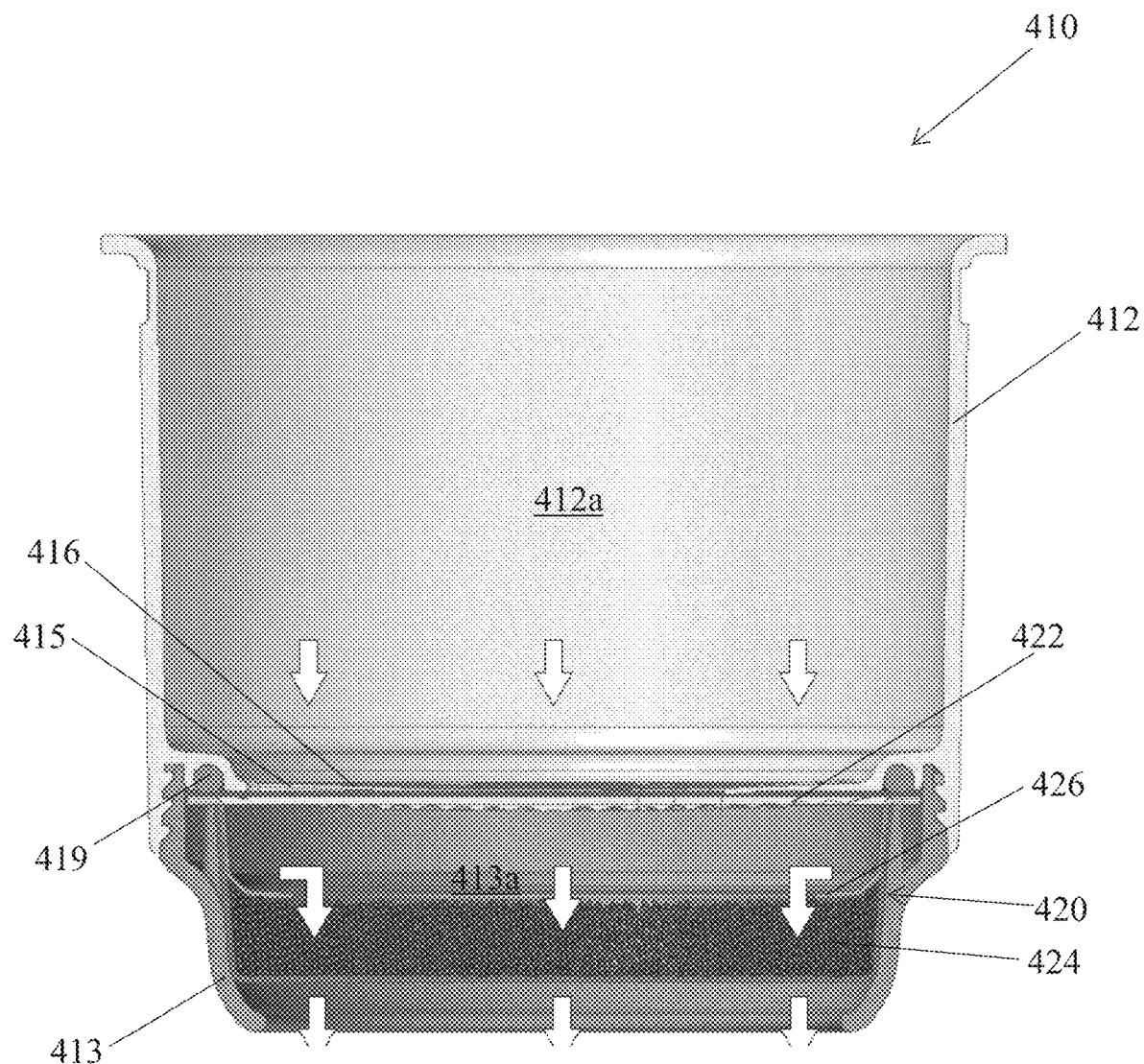
FIG. 19 is a sectioned view of the filtration device, illustrating the flow mechanism within.

Illustrated in FIG. 18 and FIG. 19 is the general flow mechanism of water (shown by block arrow) when being introduced into the water filtration pitcher 400 through the fluid inlet 414 on the top of the lid assembly 430, the flow mechanism functions as follows:

1. Entry Through the Lid Assembly: Water is poured into the re-closable inlet 431 situated at the center of the lid assembly 430. The design of the inlet 431 features a tapered profile which aids in funneling the water towards the center, improving the direction of the flow towards the filtration device 410 below.
2. Preliminary Filtration: Immediately beneath the re-closable inlet 431, a sieve 433 is present as the first point of contact for the incoming water. This sieve 433 acts as a pre-filter to capture larger particulates, preventing them from entering the filtration device 410 and potentially clogging the filter media.
3. Dispersion into the First Housing Portion: The water, upon passing through the sieve 433 on the lid assembly 430, proceeds into the first internal space 412a of the first housing portion 412 of the filtration device 410. The first internal space 412a serves as a temporary holding area for the unfiltered water. The base 415 of the first housing portion 412 features a configuration of apertures 416 designed to distribute the water over the surface of the first filter media 422. This arrangement could be effective for mitigating the risk of channeling. The apertures 422 are strategically positioned to not only facilitate the even spread of water but also to ensure that the entirety of the first filter media 422 is utilized effectively. As the water permeates through this first stage of filtration, it is then directed downwards where subsequent stages of purification will take place.

4. Transition to the Second Housing Portion: Upon transitioning from the first housing portion 412, the water enters the second internal space 413a of the second housing portion 413 through the apertures 416 on the base 415 of the first housing portion 412. A gasket 419 is strategically positioned between the base 415 and the filtration element assembly 420 to prevent any potential leakage, ensuring that all water is effectively directed into the second housing portion 413 for further filtration. The gasket 419 is essential for maintaining the integrity of the filtration process, as it guarantees that the water has to pass through the prescribed filtration stages without any bypass or loss of unfiltered water to other parts of the filtration device 410.

5. Passage Through the Filter Element Assembly: As the water descends within the filtration device 410, it first engages with the first filter media 422 housed in the second housing portion 413. This stage may consist of layered filtration substrates designed to sequentially intercept and mitigate various impurities. After traversing the first filter media 422, the water transitions into the second filter media 424 (see FIG. 19). Upon this point, a strategically positioned deflector 426 influences the flow dynamics, guiding a portion of the water away from the periphery side of the filter element assembly 420 before entering the second filter media 424. The deflection 426 is instrumental in mitigating channeling and thus optimizing contaminant removal efficiency.

6. Exit from Filtration: Subsequent to its transit through the filtration within the filter element assembly 420, the water, now subjected to substantial contaminant reduction or removal, accumulates in the reservoir 402 in the water pitcher body 401, thereby rendering it suitable for consumption.

7. Dispensing: The design of the water pitcher 401 allows for the filtered water to be dispensed while the filtration device 410 remains in place. This may involve a spout 404 (see FIG. 13) or other dispensing mechanism that permits the clean water to be poured out for use without disturbing the filtration device 410.

The disclosed filtration device and water filtration pitcher facilitate an intuitive and low-effort process for introducing water into the filtration device and collecting the resultant filtered water, thereby ensuring a comprehensive purification process and delivering water that is safe and pleasant for consumption. It is recognized that while activated carbon filters exhibit substantial service lives, their filtration efficacy inevitably declines as adsorptive sites become saturated. The interval at which the activated carbon media necessitates replacement is contingent upon the quality of the input water and the cumulative volume processed. Notably, activated carbon is incapable of in situ regeneration. Thus, it is required to be replaced consequent to the exhaustion of its adsorptive capacity. The inventive concept herein addresses this limitation by incorporating one or more filter medias within a replaceable cartridge, thereby simplifying the replacement process and minimizing user intervention.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims. It shall be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. For example, it shall be understood that the filter 100 in FIG. 5 can be configured to assemble to the reservoir 2 in a way as illustrated in FIG. 14. That means, the embodiment in FIG. 5 can be provided with a housing portion, the filter 100 is coupled to the lower part of the housing portion via threaded connection as described in FIGS. 12-19.

NUMERICAL REFERENCES 1, 10, 20 pitcher
2 reservoir
3 open-top rim
100, 200, 300 filter
110, 210, 310 housing
111 upper rim
112 top cover
113 handle
114, 221, 321 water inlet
120 deflector plate
121 support member
130 water impermeable plate
122 central aperture
131 circular gap
140 rib
141 window
151 first filter material layer
152 second filter material layer
153 third filter material layer
1531 supporting layer
1532 prefilter layer
1533 nanofiber-coated layer
1534 nanofiber layer
1535 protective layer
160 air release device
161 top portion
1611 horizontal part
1612 vertical part
162 inner cavity
163 air inlet
164 aperture or channel
165 air outlet
166 passageway
167 floating ball
168 sealing member
170 vessel
171 lower portion
172 upper portion 173 downwardly tapering conical side wall
211, 311 closed bottom
212, 312 water outlet
220, 320 filter media
400 water filtration pitcher
401 water pitcher body
402 reservoir
403 resealable junction
404 spout
410 filtration device
411 lid
412 first housing portion
413 second housing portion
414 filter inlet
415 base
416 aperture
417 filter outlet
418 annular ridge
419 gasket
420 filter element assembly
421 enclosure
422 first filter media
423 holder
424 second filter media
425 support member
426 deflector
427 annular flange
430 lid assembly
431 re-closable inlet
432 closure member
433 sieve
434 slot
435 handle

What is claimed is:

1. A filtration device adapted for removably installing to a container, comprising:
 a first housing portion, comprising a filter inlet, and defining a first internal space for temporarily accommodating fluid to be filtered;
 a second housing portion coupled to the first housing portion, comprising a filter outlet, and defining a second internal space positioned downstream the first internal space; and
 a filter element assembly is constructed as a replaceable cartridge situated within the second internal space, comprising:
 an enclosure defining a compartment therein;
 a first filter media situated upstream the compartment; and
 a second filter media disposed within the compartment;
 wherein the enclosure is formed from a fluid permeable material and is structurally supported by a support member situated within the compartment and upstream the second filter media, the support member is provided with a deflector, such that at least a portion of fluid that has passed through the first filter media is directed away from a circumferential side of the enclosure before entering the second filter media.

2. The filtration device according to claim 1, wherein the deflector comprises an annular lip at its downstream end, the annular lip is angled downward to direct the flow of fluid away from the circumferential side.

3. The filtration device according to claim 1, wherein the cartridge is constructed by ultrasonic welding the enclosure, the first filter media, and the deflector together.

4. The filtering device according to claim 1, wherein the first filter media comprises one or more filtering substrates comprising one or more polymer-based nanofibers; and the second filter media is adapted for filtering contaminants comprising chlorides in the fluid, and comprises a granular filtration material comprising activated carbon, ion exchange resin or a combination thereof.

5. The filtration device according to claim 1, wherein the support member is made of a rigid or stiff material.

6. The filtration device according to claim 4, wherein the enclosure has a complementary shape with respect to the second internal space.

7. The filtration device according to claim 1, wherein the second housing portion is detachably coupled to the first housing portion by means of threaded engagement; the filter element assembly is secured by means of the coupling between the first housing portion and the second housing portion.

8. The filtration device according to claim 7, wherein the filter element assembly is provided with an annular flange adapted for interfacing with an annular ridge provided on the second housing portion, the annular ridge abuts against the annular flange and the first housing portion when the first housing portion is coupled with the second housing portion.

9. The filtration device according to claim 1, wherein the first housing portion comprises a base with a plurality of apertures, with the base abutting against the first filter media, a gasket is provided between the base and the first filter media for facilitating sealing therebetween.

10. The filtration device according to claim 1, further comprising a lid assembly adapted for forming a closure for the filter inlet of the first housing portion, the lid assembly provides a re-closable inlet at a center thereof, and a pivotably mounted closure member is provided for closing the re-closable inlet, the re-closable inlet is tapered towards the center for facilitating the flow of fluid thereto, wherein a sieve is provided immediately downstream the re-closable inlet.

11. A water filtration pitcher comprising:
 a water pitcher body having a top opening;
 a filtration device removably installable within the water pitcher body, comprising:
 a first housing portion comprising a filter inlet and defining a first internal space for temporarily accommodating fluid to be filtered;
 a second housing portion coupled to the first housing portion, the second housing portion comprising a filter outlet and defining a second internal space positioned downstream the first internal space; and
 a filter element assembly situated within the second internal space, comprising:
 an enclosure defining a compartment therein;
 a first filter media situated upstream the compartment; and
 a second filter media disposed within the compartment;
 wherein the enclosure is formed from a fluid permeable material and is structurally supported by a support member situated within the compartment and upstream the second filter media, the support member is provided with a deflector, such that at least a portion of water that has passed through the first filter media is directed away from a circumferential side of the enclosure before entering the second filter media.

12. The water filtration pitcher according to claim 11, wherein the deflector comprises an annular lip at its downstream end, the annular lip is slightly angled downward to direct the flow of fluid away from the circumferential side.

13. The water filtration pitcher according to claim 11, wherein the filter element assembly is constructed as a replaceable cartridge by ultrasonic welding the enclosure, the first filter media, and the deflector together.

14. The water filtration pitcher according to claim 11, wherein the first filter media comprises one or more filtering substrates comprising one or more polymer-based nanofibers.

15. The water filtration pitcher according to claim 14, wherein the second filter media is adapted for filtering contaminants comprising chlorides in the water; and comprises a granular filtration material comprising activated carbon, ion exchange resin or a combination thereof.

16. The water filtration pitcher according to claim 11, where the filtration device comprises a lid assembly adapted for forming a closure for the filter inlet of the first housing portion.

17. The water filtration pitcher according to claim 16, wherein the lid assembly provides a re-closable inlet at a center thereof, and a pivotably mounted closure member is provided for closing the re-closable inlet.

18. The water filtration pitcher according to claim 17, wherein a sieve is provided immediately downstream the re-closable inlet.

19. The water filtration pitcher according to claim 18, wherein a pivotably mounted closure member is provided for closing the re-closable inlet.

20. The water filtration pitcher according to claim 16, wherein the filtration device is configured to form a closure for the top opening of the water filtration pitcher.

\* \* \* \* \*